(12) United States Patent
One et al.

(10) Patent No.: US 9,199,374 B2
(45) Date of Patent: Dec. 1, 2015

(54) CONTROL UNIT, CONTROL METHOD, AND CONTROL PROGRAM OF ARTICULATED ROBOT

(75) Inventors: Tsutomu One, Kobe (JP); Toshihiko Nishimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 85 days.

(21) Appl. No.: 14/003,449

(22) PCT Filed: Mar. 2, 2012

(86) PCT No.: PCT/JP2012/055314
§ 371 (c)(1),
(2), (4) Date: Sep. 5, 2013

(87) PCT Pub. No.: WO2012/121125
PCT Pub. Date: Sep. 13, 2012

(65) Prior Publication Data
US 2013/0338827 A1 Dec. 19, 2013

(30) Foreign Application Priority Data

Mar. 8, 2011 (JP) .................................. 2011-050450
Nov. 22, 2011 (JP) .................................. 2011-254806

(51) Int. Cl.
*G05B 19/41* (2006.01)
*B25J 9/10* (2006.01)
(Continued)

(52) U.S. Cl.
CPC *B25J 9/10* (2013.01); *B25J 9/1664* (2013.01); *G05B 19/4103* (2013.01); *G05B 19/423* (2013.01); *G05B 2219/34083* (2013.01); *G05B 2219/45104* (2013.01); *Y10S 901/41* (2013.01)

(58) Field of Classification Search
CPC .......... B25J 9/10; B25J 9/1664; B25J 9/1661; B25J 9/1671; G05B 19/4103; G05B 19/423; G05B 2219/45104; G05B 2219/34083; G05B 19/4062; G05B 19/4063; G05B 19/41; G05B 19/4105; Y10S 901/41

USPC .......................... 700/250, 252, 253, 254, 256
See application file for complete search history.

(56) References Cited

U.S. PATENT DOCUMENTS 4,594,671 A * 6/1986 Sugimoto et al. ............. 700/263
4,604,716 A * 8/1986 Kato et al. ..................... 700/251
(Continued)

FOREIGN PATENT DOCUMENTS

JP 62-162109 A 7/1987
JP 63-305407 A 12/1988
(Continued)

OTHER PUBLICATIONS

International Search Report; PCT/JP2012/055314; May 29, 2012.
(Continued)

*Primary Examiner* — Stephen Holwerda
(74) *Attorney, Agent, or Firm* — Studebaker & Brackett PC

(57) ABSTRACT

In order to suppress fluctuations in specific components of posture angle in a target coordinate system while maintaining the position of the leading edge of the wrist, the velocity of movement of the leading edge of the wrist, and the permissible velocity of the shaft during velocity suppression, an articulated robot which moves while calculating the position in interpolated points on a teaching path, the posture and the angles in each axis is provided, wherein a judgment is made as to whether the velocity of the wrist shaft exceeds a permissible limit, and if the permissible limit is exceeded, a plurality of candidates for angle of the wrist shaft that maintain the velocity within permissible limits are calculated, and the candidate with the minimum fluctuation in the specific component of the posture angle of the weld line coordinate system is selected.

12 Claims, 14 Drawing Sheets

(51) Int. Cl.
*G05B 19/4103* (2006.01)
*G05B 19/423* (2006.01)
*B25J 9/16* (2006.01)

(56) References Cited

U.S. PATENT DOCUMENTS

| | | | |
|---|---|---|---|
| 4,718,078 A * | 1/1988 | Bleidorn et al. | 700/256 |
| 5,197,014 A * | 3/1993 | Seki et al. | 700/189 |
| 2003/0171847 A1* | 9/2003 | Cheng et al. | 700/245 |
| 2009/0179021 A1* | 7/2009 | Nishimura et al. | 219/136 |
| 2011/0106308 A1* | 5/2011 | Eliasson | 700/250 |

FOREIGN PATENT DOCUMENTS

| | | |
|---|---|---|
| JP | 04-205208 A | 7/1992 |
| JP | 06-324730 A | 11/1994 |
| JP | 08-305423 A | 11/1996 |
| JP | 2003-300183 A | 10/2003 |
| JP | 2009-113172 A | 5/2009 |
| JP | 2009-166076 A | 7/2009 |
| JP | 2009-166164 A | 7/2009 |
| KR | 2000-0046432 A | 7/2000 |
| KR | 2004-0034167 A | 4/2004 |
| KR | 2009-0078737 A | 7/2009 |

OTHER PUBLICATIONS

Written Opinion of the International Searching Authority; PCT/JP2012/055314; May 29, 2012.

* cited by examiner

FIG. 8
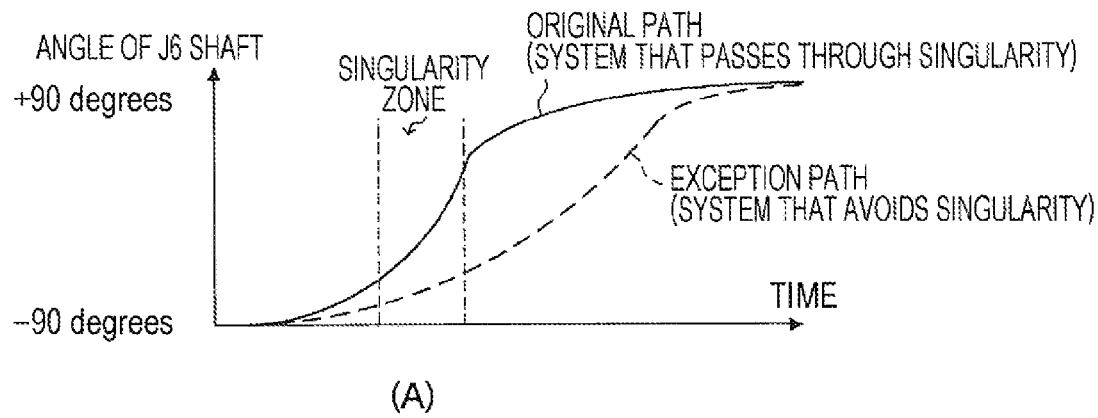
(A)
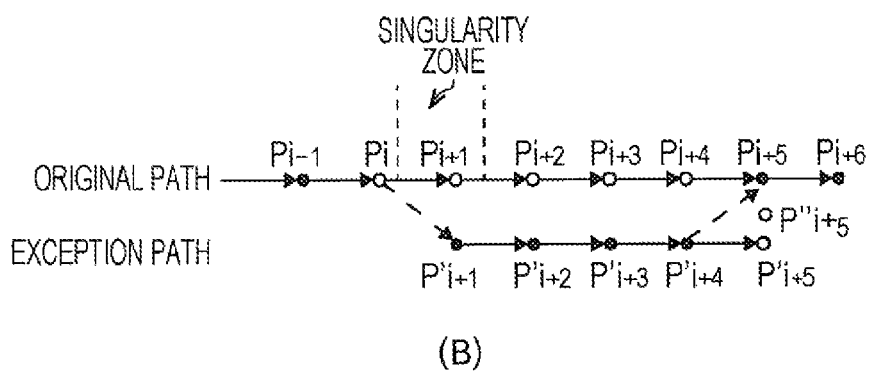
(B)
FIG. 9
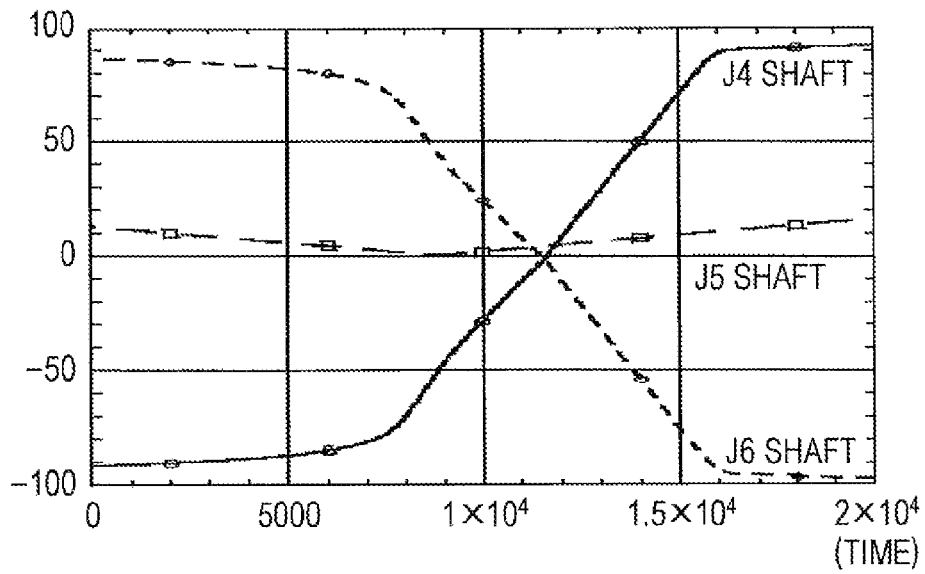

(A)  (B)

CONTROL UNIT, CONTROL METHOD, AND CONTROL PROGRAM OF ARTICULATED ROBOT

TECHNICAL FIELD

The present invention relates to a control unit, a control method, and a control program of an articulated robot and, in particular, to a technology for maintaining the speeds of drive shafts of wrist axes within an allowable range while maintaining the attitude of the wrist if the speeds of the drive shafts exceed the allowable range.

BACKGROUND ART

As illustrated in FIG. 23, a six-axis manipulator, which is a sort of an articulated robot, has a J1 axis, a J2 axis, and a J3 axis, which are joint axes that control an arm shaft mounted on a base. The J1 axis, the J2 axis, and the J3 axis are sequentially arranged from the base. In addition, the six-axis manipulator has a J4 axis, a J5 axis, and a J6 axis, which control wrist axes and are sequentially arranged from an arm portion to the top end of the wrist. In such a case, if joints angles $\theta_1$ to $\theta_6$ are given to the J1 axis to J6 axis, respectively, the XYZ coordinates of the position of an end effector (an effector; such as a welding device, attached to the top end of a robot arm) and the attitude angles of the end effector $\alpha$, $\beta$, and $\gamma$ (note that attitude angles $\alpha$, $\beta$, and $\gamma$ are in the form of Euler angles or the roll/pitch/yaw angles) can be obtained by calculating a solution to a forward kinematics problem. Conversely, if the XYZ coordinates of the position and the attitude angles $\alpha$, $\beta$, and $\gamma$ of the end effector are given, the joint angles $\theta_1$ to $\theta_6$ of the J1 axis to the J6 axis can be obtained by calculating a solution to an inverse kinematics problem.

As illustrated in FIG. 24, when the joint angle $\theta_5$ of the J5 axis is substantially 0 degree and if the end effector is attempted to move at a constant speed, the joint angle $\theta_4$ of the J4 axis and the joint angle $\theta_6$ of the J6 axis rapidly change. Accordingly, the J4 axis and the J6 axis need to rotate at high speed. However, the speed of each of the joint shafts of the manipulator cannot exceed the upper limit. If the manipulator is forced to operate so that the speed exceeds its upper limit, the end effector may step off a predetermined path or the end effector may vibrate. As described above, even if the position and the attitude angle of the end effector of the articulated manipulator is slightly varied, a joint shaft that is required to rotate at a significantly high rotational speed may appear and, therefore, the articulated manipulator may stop. If such stoppage of the articulated manipulator occurs, it is difficult to maintain the speeds of the joint shafts and the accuracy of the path along which the end effector should move at the same time. Thus, the speed of each of the joint shafts may be decreased to lower than the rotational speed required for the joint shaft to maintain the accuracy of the path. Alternatively, a safety mechanism may be activated, stopping the operation of the manipulator.

Accordingly, PTLs 1 to 3 describe a method for operating an end effector while preventing abrupt change in the operations of the wrist shafts and maintaining the speed of each of the wrist shafts within a limited speed when the speed of one of the wrist shafts exceeds the limited speed.

CITATION LIST

Patent Literature

PTL 1: Japanese Unexamined Patent Application Publication No. 62-162109

PTL 2: Japanese Unexamined Patent Application Publication No. 6-324730

PTL 3: Japanese Unexamined Patent Application Publication No. 2003-300183

SUMMARY OF INVENTION

Technical Problem

However, it is widely known that when the speed of one of the joint shafts exceeds the allowable range and if the end effector is attempted to travel along a predetermined path while maintaining the speeds of the wrist shafts and operating the wrist shafts without abrupt change in the operation of each of the wrist shaft, the following three factors cannot be simultaneously satisfied: (1) the position, (2) the moving speed, and (3) the attitude angles. Accordingly, in widely used manipulators, the operation of the manipulator is controlled so that only one or two of the factors (1) to (3) are satisfied.

For example, PTLs 1 and 2 describe a method for maintaining (1) the position and (3) the attitude angles of an end effector. However, (2) the moving speed cannot be maintained and, thus, the moving speed is slowed down. Accordingly, if the end effector includes a welding device, the end effector moves along the working line for a period of time that is longer than the originally required period of time. Thus, the welding time is longer than that for another portion, and the strength of the weld portion may be decreased. In addition, since the moving speed is slowed down, a portion for which the welding time is increased may excessively bulge. Thus, the next manufacturing step (e.g., a step of welding a second layer) may be interfered by the excessive bulge.

In addition, PTL 3 describes a method for maintaining one of the moving speed and the position of an end effector. If the moving speed is maintained, the position cannot be maintained. Thus, if the end effector includes a welding device or a painting device, the end effector may step off a predetermined working line. As a result, welding or painting may not produce quality weld or quality paint.

Accordingly, it is an object of the present invention to provide a control unit, a control method, and a control program of an articulated robot capable of, when a wrist shaft needs to abruptly move so as to exceed a predetermined allowable range, maintaining the position of the top end of a wrist and the moving speed of the top end of the wrist, which are particularly required for a welding or painting operation, within the allowable range and reducing a variation in at least one particular component of attitude angles in a work coordinate system for the intended purpose.

Solution to Problem

To achieve the above-described object, the present invention is applied to a control unit of an articulated robot for controlling the articulated robot including a first articulated drive system having a working part that moves along a working line of a workpiece on a top end thereof and three drive shafts that are connected to the working part and that change the attitude of the working part and a second articulated drive system having at least three drive shafts that are connected to the first articulated drive system and that change the position of the first articulated drive system. The control unit includes the following means (11) to (16):

(11) interpolation data calculating means for calculating data describing the position and attitude of the working part at each of a plurality of interpolated points that lie on a previous teaching path connecting the work start point and attitude to the work end point and attitude of the working part in a base coordinate system of the articulated robot,

(12) angle calculating means for calculating the angles of all of the drive shafts in the first articulated drive system and the second articulated drive system, the angles representing the position and the attitude of the working part at each of the interpolated points by finding a solution to an inverse kinematics problem from the data calculated by the interpolation data calculating means,

(13) speed calculating means for calculating the speeds of two drive shafts located at both ends of the first articulated drive system when the attitude of the working part is moved to the next interpolated point on the basis of a difference between the angle of each of the drive shafts of the first articulated drive system at a current interpolated point and the angle at the next interpolated point calculated by the angle calculating means,

(14) attitude data converting means for converting the data calculated by the interpolation data calculating means into attitude data describing the attitude of the working part in a work coordinate system having an axis extending in a moving direction of the working part, an axis extending in a direction that is perpendicular to the axis in the moving direction, and an axis perpendicular to each of the two axes,

(15) recalculating means for, if the speed of at least one of the two drive shafts located at both the ends of the first articulated drive system and calculated by the speed calculating means is outside a predetermined allowable range, recalculating the angles of the drive shafts of the first articulated drive system so that the speeds of the two drive shafts located at both the ends of the first articulated drive system are within the allowable range without changing the moving speed of the working part and with reducing variation of one or two of particular components of the attitude data of the working part at the next interpolated point converted by the attitude data converting means and recalculating the angles of the drive shafts of the second articulated drive system on the basis of the calculated angles of the drive shafts of the first articulated drive system and the position of the working part calculated by the interpolation data calculating means, and

(16) drive instructing means for, if the speeds of the two drive shafts located at both ends of the first articulated drive system calculated by the speed calculating means are within the allowable range, driving the articulated robot on the basis of the angles of the drive shafts calculated by the angle calculating means and, if the speed of at least one of the two drive shafts located at both ends of the first articulated drive system calculated by the speed calculating means is outside the allowable range, driving the articulated robot on the basis of the angles of the drive shafts calculated by the recalculating means.

According to the present invention, even when the drive shaft of the first articulated drive system needs to abruptly change so as to exceed the allowable range, the position of the top end of the working part, the moving speed of the top end of the wrist, which are particularly required for a welding or painting operation, and the allowable range of the drive shafts of the first articulated drive system can be maintained. In addition, variation in at least one particular component of attitude angles in a work coordinate system corresponding to an intended purpose can be reduced. Furthermore, when a singularity region and a singularity avoidance path appearing in a path from the work start point to the work end point are calculated, an arithmetic unit (a CPU) that can handle significant load imposed in a pre-computation phase need to be provided and, thus, the cost increases. However, according to the present invention, drive can be controlled on the fly in accordance with a current state and the next state. Therefore, the peak processing load imposed on the arithmetic unit can be reduced and, thus, the cost can be reduced.

For example, the recalculating means can include angle candidate calculating means for calculating, on the basis of the angle of each of the drive shafts of the first articulated drive system at the current interpolated point, a plurality of candidates of the angle of each of the drive shafts so that the angle of the drive shaft references and follows the angle at the next interpolated point calculated by the angle calculating means and, in addition, the speeds of two drive shafts located at both ends of the first articulated drive system at the next interpolated point are within the allowable range, attitude data calculating means for calculating attitude data that defines the attitude of the working part at the next interpolated point in the work coordinate system when each of the candidates of the angle calculated by the angle candidate calculating means is employed, and angle selecting means for selecting, from among the plurality of attitude data calculated by the attitude data calculating means, attitude data having the smallest variation of the particular component for the attitude data of the working part at the next interpolated point converted by the attitude data converting means and selecting the angle corresponding to the attitude data as the angle of the drive shaft.

In this manner, when the position and attitude of the working part are moved, variation in the particular component appropriate for the intended work purpose of the working part can be reduced.

In addition, when the angle of the drive shaft of the first articulated drive system is defined as ±180°, the angle calculating means can calculate a solution to an inverse kinematics problem in which the sign of the angle of the drive shaft located in the middle of the first articulated drive system at the next interpolated point is the same as the sign of the angle of the drive shaft at the work start point. In this manner, control can be performed such that the angle of the drive shaft located in the middle of the first articulated drive system does not pass through 0°. Thus, a singularity can be avoided.

In addition, if the speeds of the two drive shafts located at both ends of the first articulated drive system calculated by the speed calculating means are within the allowable range, the angle calculating means can calculate a solution to an inverse kinematics problem in which the sign of the angle of the drive shaft located in the middle of the first articulated drive system at the next interpolated point is the same as the sign of the angle of the drive shaft at the work start point. However, if the speed of at least one of the two drive shafts located at both ends of the first articulated drive system calculated by the speed calculating means is outside the allowable range, the angle calculating means can calculate a solution to an inverse kinematics problem in which the sign of the angle of the drive shaft located in the middle of the first articulated drive system at the next interpolated point is opposite to the sign of the angle of the drive shaft at the work start point.

Furthermore, a configuration obtained by combining these configurations can be provided. That is, if the signs of the angles of the drive shaft located in the middle of the first articulated drive system at the work start point and at the work end point are the same, it is desirable that the angle calculating means calculate a solution to an inverse kinematics problem in which the sign of the angle of the drive shaft located in the middle of the first articulated drive system at the next interpolated point is the same as the sign of the angle of the drive shaft at the work start point. When the signs of the angles of the drive shaft located in the middle of the first articulated drive system at the work start point and the work end point are opposite to each other and if the speeds of the two drive shafts located at both ends of the first articulated drive system calculated by the speed calculating means are within the allowable range, it is desirable that the angle calculating means calculate a solution to an inverse kinematics problem in which the sign of the angle of the drive shaft located in the middle of the first articulated drive system at the next interpolated point is the same as the sign of the angle of the drive shaft at the work start point. If the speed of at least one of the two drive shafts located at both ends of the first articulated drive system calculated by the speed calculating means is outside the allowable range, it is desirable that the angle calculating means calculate a solution to an inverse kinematics problem in which the sign of the angle of the drive shaft located in the middle of the first articulated drive system at the next interpolated point is opposite to the sign of the angle of the drive shaft at the work start point. In this manner, the angle of the drive shaft located in the middle of the first articulated drive system at the work end point can be set as taught.

Still furthermore, the recalculating means can recalculate the angle of the drive shaft so that among the particular components of the attitude data of the working part converted by the attitude data converting means, as a particular component has a higher predetermined weight, an amount of reduction in variation of the particular component is higher. Accordingly, by appropriately assigning a weight, an amount of reduction in variation of the particular component can be controlled as needed.

In a particular configuration according to the present invention, the working part can be a torch. In addition, the attitude data can be expressed in the work coordinate system having an X-axis extending in a direction in which the working part moves, a Y-axis defined as a cross product of the X-axis and a direction of gravitational force, a Z-axis extending in a direction defined as a cross product of the X-axis and the Y-axis, a torch inclination angle defined as a rotation angle about the X-axis, a torch forward tilting angle defined as a rotation angle about the Y-axis, and a torch rotation angle defined as a rotation angle about the Z-axis, and the particular component can be one or two of the torch inclination angle, the torch forward tilting angle, and the torch rotation angle. As illustrated in FIG. 25, by expressing the attitude of the working part provided at the top end of the wrist in a weld line coordinate system Σline (the work coordinate system) having an X-axis extending in the direction in which the working part moves using the position of the top end of the wrist XYZ and the attitude of the top end of the wrist αβγ defined in an orthogonal coordinate system Σbase, the attitude of the working part can be expressed as inclination components about the axes, as illustrated in FIGS. 26 to 28. The converted rotation angles about the coordinate axes of the weld line coordinate system Σline are defined as the torch inclination angle Rx (the direction of the rotation angle about an Xline axis in a right screw direction is positive, as illustrated in FIGS. 26 and 27), the torch forward tilting angle Ry (the direction of the rotation angle about a Yline axis in a right screw direction is positive, as illustrated in FIGS. 26 and 28), and the torch rotation angle Rz (the direction of the rotation angle about a Zline axis in a right screw direction is positive).

At that time, if the working part is a single torch having, at the top end thereof one point of operation having an effect of work on the workpiece, the particular component can be each of the torch inclination angle and the torch forward tilting angle. In this manner, variation of each of the torch inclination angle and the torch forward tilting angle that are important for the operation of a single torch having one point of operation can be reduced.

In contrast, if the working part is a tandem torch having, at the top end thereof, two points of operation each having an effect of work on the workpiece, the particular component can be each of the torch inclination angle and the torch rotation angle. In this manner, variation of each of the torch inclination angle and the torch rotation angle that are important for the operation of a tandem torch having two points of operation can be reduced.

Furthermore, after the speed allowance determining means determines that a drive shaft outside the allowable range is present, the drive instructing means can instruct drive of the articulated robot on the basis of the angles of the drive shafts calculated by the recalculating means. Subsequently, if a difference between the angle of the first articulated drive system calculated by the angle calculating means and the angle of the first articulated drive system calculated by the recalculating means is less than or equal to a predetermined value, the drive instructing means can instruct drive of the articulated robot on the basis of the angles of the drive shafts calculated by the angle calculating means instead of the angles of the drive shafts calculated by the recalculating means.

At that time, upon switching from drive control of the articulated robot based on the angles of the drive shafts calculated by the recalculating means to drive control of the articulated robot based on the angles of the drive shafts calculated by the angle calculating means, the drive instructing means can gradually vary each of the angles of the drive shafts within a predetermined fluctuation range. In this manner, vibration of the working line along which a workpiece moves can be prevented and, therefore, movement that does not track the working line can be prevented. For example, the angle may be an intermediate angle between the angle calculated by the recalculating means and the angle calculated by the angle calculating means through drive control of the articulated robot.

Furthermore, the speed calculating means can calculate acceleration instead of speed, and the recalculating means and the drive instructing means can make determination on the basis of the acceleration instead of the speed.

It should be noted that the present invention can be considered as an invention of a method for controlling an articulated robot that executes the steps performed in the control unit of the articulated robot or an invention of a control program that causes a computer to execute the steps.

Advantageous Effects of Invention

According to the present invention, even when a slight motion of the top end of the wrist causes abrupt change in the axis of the wrist to a value outside a predetermined allowable amount, the position of the top end of the wrist that is particularly important for a welding or painting operation, the moving speed of the top end of the wrist, and the allowable speed of the axis of the wrist can be maintained. In addition, a variation of at least one of particular components of the attitude angle of the work coordinate system for an intended purpose can be reduced. In addition, when a singularity region and a singularity avoidance path appearing in a path from the work start point to the work end point are calculated, an arithmetic unit (a CPU) that can handle significant load imposed in a pre-computation phase need to be provided and, thus, the cost increases. However, according to the present invention, drive can be controlled on the fly in accordance with the current state and the next state. Therefore, the peak processing load imposed on the arithmetic unit can be reduced and, thus, the cost can be reduced.

BRIEF DESCRIPTION OF DRAWINGS

FIG. 8(A) illustrates an example of variations of the angle of a J6 axis in an original path and in an exception path; and FIG. 8(B) illustrates an example of an interpolated point in the original path and an interpolated point in the exception path.

FIG. 9 is a diagram illustrating an example of a variation of the angle of a first joint drive shaft in a path that avoids a singularity.

DESCRIPTION OF EMBODIMENTS

For ease of understanding of the present invention, embodiments of the present invention are described below with reference to the accompanying drawings. It should be appreciated that the following embodiments are only specific examples of the present invention, and are not intended to limit the technical scope of the invention in any way.

Figure 1:
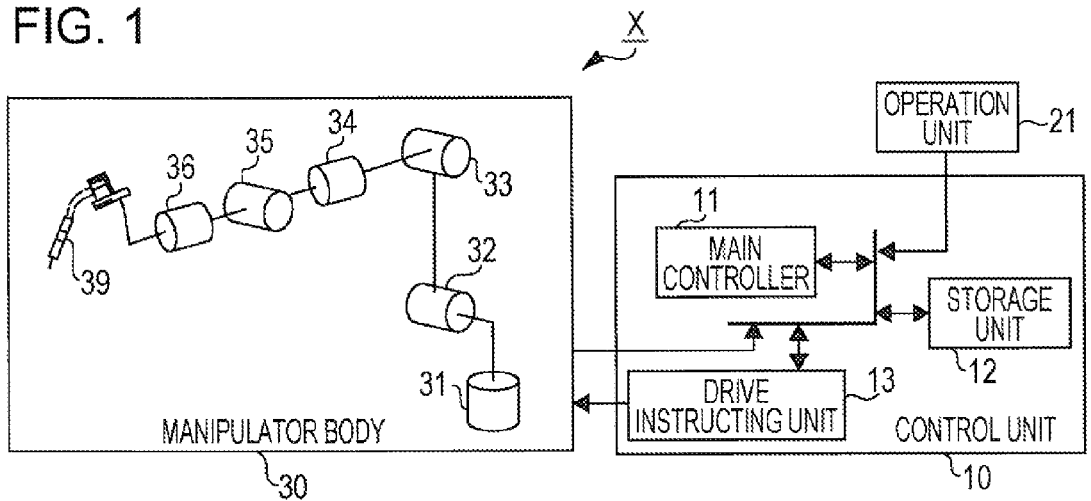
FIG. 1 is a block diagram of a schematic configuration of an articulated robot X controlled using an example of an articulated robot control method according to an embodiment of the present invention.

The configuration of an articulated robot X according to an embodiment of the present invention is described first with reference to a block diagram illustrated in FIG. 1.

The articulated robot X includes a control unit 10, an operation unit 21, and a manipulator body 30. Note that although, in addition to the components illustrated in FIG. 1, the articulated robot X includes other components that a widely used articulated robot includes, these components are not illustrated in FIG. 1. The control unit 10 includes a main controller 11, a storage unit 12, and a drive instructing unit 13. The control unit 10 is an example of a control unit of the articulated robot according to the present invention.

The manipulator body 30 includes a second articulated drive system having a J1 axis 31, a J2 axis 32, and a J3 axis 33, a first articulated drive system having a J4 axis 34, a J5 axis 35, and a J6 axis 36, and an end effector 39. The second articulated drive system corresponds to a human arm, and the first articulated drive system corresponds to a human wrist. The end effector 39 has an effect on a workpiece. The manipulator body 30 is a robot that is driven in accordance with operation information and that works in the same manner as the upper arm of a human does. Note that the manipulator body 30 is an example of an articulated robot.

The J1 axis 31 to the J6 axis 36 are formed from, for example, electric motors. The J1 axis 31 to the J6 axis 36 are rotatingly driven in positive and negative direction in accordance with an instruction received from the drive instructing unit 13. By rotatingly driving the plurality of shafts in a cooperative manner, the motion of the human wrist and arm can be carried out. In particular, the second articulated drive system can freely produce the position (X, Y, Z) of the end effector 39 in a base coordinate system Σbase of the articulated robot regardless of the operations of the drive shafts of the first articulated drive system.

The end effector 39 is an effector attached to the top end of the manipulator body 30 (the top end of the J6 axis 36). Examples of the end effector 39 include a welding device (a torch), a painting device, a tool, a grabber, and a sensor that operate using a single point of operation. Note that the end effector 39 is an example of a working part.

In addition, a torch having a single point of operation is referred to as a "single torch".

The operation unit 21 includes, for example, a sheet key and an operation button, and an operation lever operated by a user. The operation unit 21 serves as an input interface that receives an operational input from the user. For example, the operation unit 21 receives the position and attitude of the end effector 39 when the operation starts, the position and attitude of the end effector 39 when the operation ends, an operation path from the work start point and the work end point, an operation time, weight information used for reducing a variation in each of the components of the attitude angle of the end effector 39 in a desired weld line coordinate system Σline (an operation coordinate system), and a program including such information. Thereafter, the operation unit 21 outputs such received information to the control unit 10. That is, the operation unit 21 is means for teaching the work start point and attitude and the work end point and attitude of the end effector 39. In addition, the operation unit 21 is means for setting the weight information.

The storage unit 12 is formed from, for example, a hard disk or a volatile memory, such as a DRAM. The storage unit 12 stores, for example, the work start point and attitude and the work end point and attitude of the end effector 39, an operation path from the work start point and attitude of the end effector 39 and the work end point and attitude, an operation time, the weight information used for reducing a variation in each of the components of the attitude angle of the end effector 39, and the angles and speeds (and the accelerations in some cases) of the J1 axis 31 to the J6 axis 36 at interpolated points calculated by the main controller 11 (for a path that passes through a singularity and a path that avoids a singularity) (note that the main controller 11 is described in more detail below).

In response to a control instruction received from the main controller 11, the drive instructing unit 13 reads the angle information or the speed information on the J1 axis 31 to the J6 axis 36 at every sampling period so as to move the end effector 39 to the next interpolated point stored in the storage unit 12 (one of the path that passes through a singularity and the path that avoids a singularity) and outputs the angle information or the speed information to the manipulator body 30. Note that the main controller 11 and the drive instructing unit 13 are an example of drive instructing means for performing a drive instruction step.

The main controller 11 includes a CPU and a ROM. The CPU is calculating means for performing various control of the articulated robot X and arithmetic calculation. The ROM is a memory for storing, for example, a control program and a computing program executed by the CPU and data that are to be referenced by the CPU when the CPU executes the programs.

An example of a procedure for operating the manipulator body 30 using mainly the main controller 11 of the articulated robot X is described next with reference to flowcharts illustrated in FIGS. 2 to 6. Note that "S11", "S12", . . . are reference symbols indicating the procedure (steps).

Figure 2:
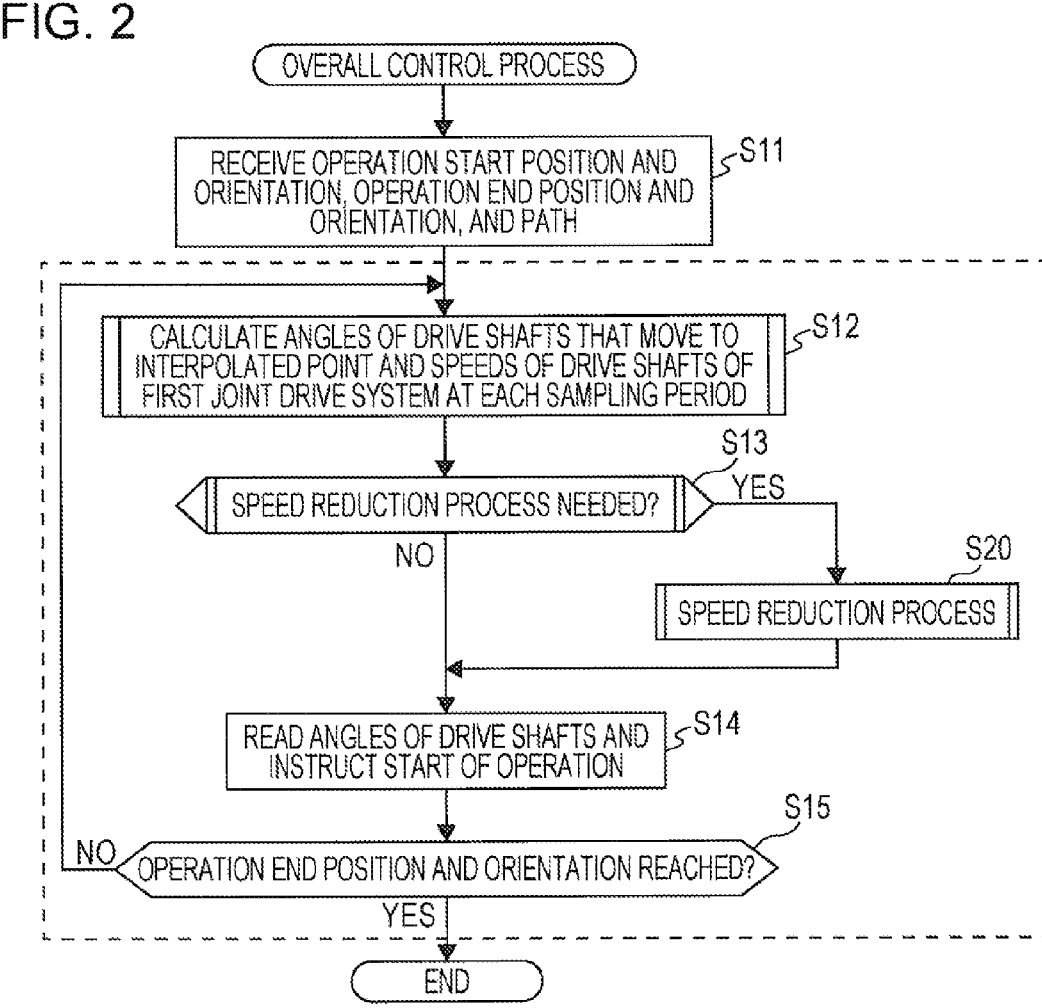
FIG. 2 is a flowchart illustrating an example of an overall control process of the articulated robot control method.

A difference between widely used control of the manipulator body 30 and the control of the articulated robot X according to an embodiment of the present invention is described first with reference to FIG. 2.

In widely used control of the manipulator body 30, as described below, a teaching step (step S11) is performed in order to teach an operation trajectory to the main controller 11. In addition, a step of calculating and storing the angle of each of the drive shafts in order to operate the manipulator body 30 so that the manipulator body 30 has the position and attitude at an interpolated point in the taught operation trajectory (step S12) is performed. Thereafter, a step of reading the calculated angles and instructing the performance of an operation (step S14) and a step of determining whether the manipulator body 30 has reached the work end point and attitude (step S15) are performed in order to operate the manipulator body 30 from the position and attitude at the current interpolated point to the position and attitude at the next interpolated point. Thereafter, by repeating steps S12, S14, and S15 at predetermined sampling periods, the manipulator body 30 is operated from the work start point and attitude to the work end point and attitude along the operation trajectory. Furthermore, by moving the end effector 39 of the manipulator body 30 at a predetermined constant speed, the main controller 11 performs the operation of the end effector 39. Note that when the end effector 39 is moved at a constant speed and if the J5 axis 35 of the first articulated drive system passes through the vicinity of 0° (a singularity), the speed of the J4 axis 34 or the J6 axis 36 may exceed a predetermined allowable range.

Thus, in addition to the above-described steps required for widely used control of a manipulator body 30, the control of the articulated robot X according to the present embodiment includes a step of determining whether the speed of at least one of the J4 axis 34 and the J6 axis 36 of the first articulated drive system exceeds the allowable range and, thus, a speed reduction process is required (step S13) and a speed reduction step of if the speed reduction process is required (YES in step S13), recalculating and restoring the angle of each of the drive shafts in order to operate the manipulator body 30 at an interpolated point in an operation trajectory that avoids a singularity (step S20). In this manner, the manipulator body 30 can be operated from the position and attitude at the current interpolated point to the recalculated position and attitude at the next interpolated point while avoiding a singularity.

The overall control process of the articulated robot X performed by the main controller 11 is described next with reference to FIG. 2. Detailed description of each of the processes is subsequently made.

First, a user teaches the operation trajectory of the robot to the articulated robot X through the operation unit 21 in a point-to-point manner. That is, the user moves the end effector 39 to each of the teaching points using the operation unit 21 and causes the articulated robot X to store the operation positions and attitudes of the end effector 39 in the storage unit 12 of the control unit 10 (step S11). Note that step S11 is an example of the teaching step.

The main controller 11 divides a section between any adjacent two of the above-described teaching points by a predetermined sampling period (e.g., ¹⁄₁₆ second or ¹⁄₃₂ second) to obtain interpolated points by interpolation. Thereafter, the main controller 11 calculates the angles of the J1 axis 31 to the J6 axis 36 and the speeds (and the acceleration in some cases) of the J4 axis 34 to the J6 axis 36 of the first articulated drive system for moving the end effector 39 to the next interpolated point. Thereafter, the main controller 11 stores the calculated angles and speeds in the storage unit 12 (step S12). At that time, each of the angles of the J1 axis 31 to the J6 axis 36 is expressed as ±180°. However, the expression of the angle is not limited to ±180°. For example, the angle may be in the range from 0° to 360°. Note that step S12 is described in more detail below.

Subsequently, the main controller 11 determines whether the speed or the acceleration of one of or both of the J4 axis 34 and the J6 axis 36 of the first articulated drive system calculated in step S12 for moving the end effector 39 to the next interpolated point is within or outside the allowable range (hereinafter referred to as "necessity/unnecessity of the speed reduction process") or whether one or both of the J4 axis 34 and the J6 axis 36 are being subjected to an avoidance process (hereinafter referred to as a "speed reduction process") after it is determined that one of the drive shafts has already been outside the allowable range (step S13). Note that step S13 is described in more detail below.

If it is determined that the speed reduction process is necessary or the speed reduction process is currently being performed (YES in step S13), the main controller 11 recalculates the angle of one or both of the J4 axis 34 and the J6 axis 36 so that the speed or the acceleration is within the allowable range by reducing an amount of reduction in one or two of the components of the attitude data of the end effector 39 at the next interpolated point calculated in step S12 without changing the moving speed of the end effector 39. Thereafter, the main controller 11 recalculates the angles of the other shafts corresponding to the above-described recalculated angle and stores the recalculated angles in the storage unit 12. In this manner, the main controller 11 performs the speed reduction process (step S20). Note that in the above description of step S20, the speed or acceleration of each of the shafts is used for determining whether the speed reduction process is necessary or not. In the following specific description of step S20, only the speed is used for the determination as an example.

However, if it is determined that the speed reduction process is unnecessary and the speed reduction process is not currently being performed (No in step S13) or if the speed reduction process is performed (step S20), the drive instructing unit 13 reads, from the storage unit 12, the angles of the J1 axis 31 to the J6 axis 36 for moving the end effector 39 to the next interpolated point in response to an instruction from the main controller 11 and outputs the angles to actuators of the drive shafts in the manipulator body 30 (step S14). At that time, if it is determined that the speed reduction process is unnecessary and the speed reduction process is not currently being performed, the manipulator body 30 is controlled on the basis of the angles of the J1 axis 31 to the J6 axis 36 calculated in step S12 for moving the end effector 39 to the next interpolated point. However, if the speeds of the J4 axis 34 and the J6 axis 36 are outside the allowable range and, thus, the speed reduction process is performed, the manipulator body 30 is controlled on the basis of the angles of the J1 axis 31 to the J6 axis 36 calculated in step S20 for moving the end effector 39 to the next interpolated point. Note that step S14 is an example of the drive instruction step, and the main controller 11 and the drive instructing unit 13 that perform the process in step S14 correspond to the drive instructing means.

Subsequently, the main controller 11 determines whether the position and attitude of the end effector 39 after movement reach the work end point and attitude (step S15). If the work end point and attitude have not been reached (NO in step S15), step S12 and the subsequent steps are performed again at predetermined sampling periods. However, if the work end point and attitude have been reached (YES in step S15), the processing is completed.

As described above, the main controller 11 computes the angles of the J1 axis 31 to the J6 axis 36 for moving the end effector 39 from the current position and attitude to the next interpolated point at predetermined sampling periods and operates the articulated robot X.

Figure 3:
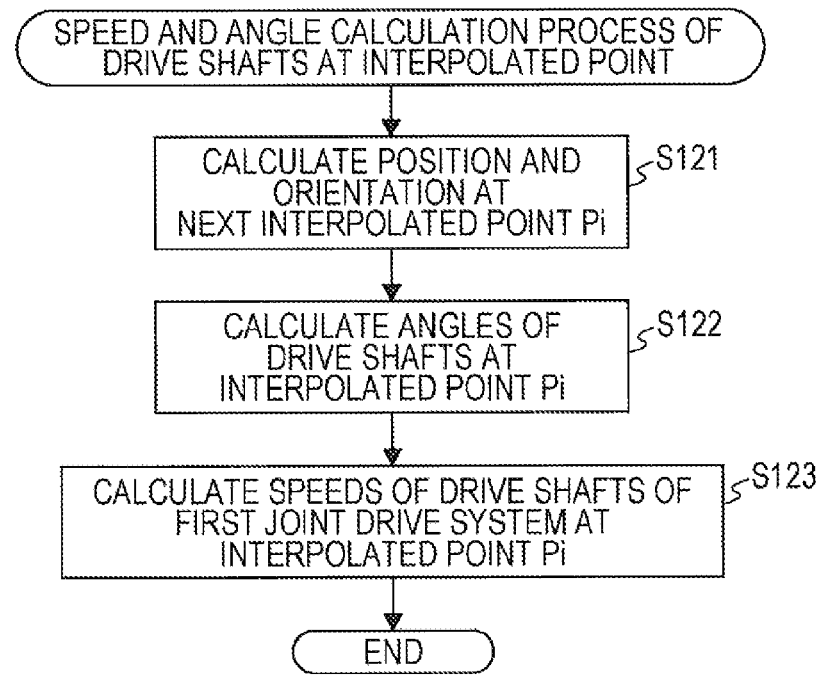
FIG. 3 is a flowchart of a speed/angle calculating process for each of rotation shafts at an interpolated point.

An example of the procedure (corresponding to step S12 illustrated in FIG. 2) for calculating the angles of the J1 axis 31 to the J6 axis 36 and the speeds of the J4 axis 34 to the J6 axis 36 of the first articulated drive system for moving the articulated robot X from the current interpolated point to the next interpolated point is described next with reference to FIG. 3.

First, the main controller 11 calculates, using interpolation, the position and attitude of the end effector 39 at each of n points (n is any number based on the sampling periods) set between the work start point and attitude $P_0$ and the work end point and attitude $P_n$ previously taught in step S11. In this case, the moving amount for one sampling period can be written in the form: $\Delta P = (P_n - P_0)/n = \{\Delta X = (X_n - X_0)n, \Delta Y = (Y_n - Y_0)/n, \Delta Z = (Z_n - Z_0)/n, \Delta\alpha = (\alpha_n - \alpha_0)/n, \Delta\beta = (\beta_n - \beta_0)/n, \Delta\gamma = (\gamma_n - \gamma_0)/n\}$. Note that the above-described interpolated points are expressed using the base coordinate system Σbase of the articulated robot X.

Figure 7:
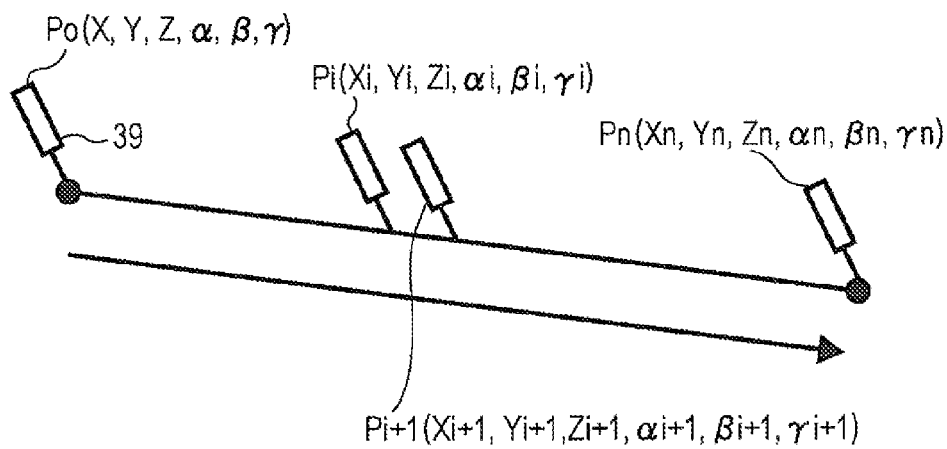
FIG. 7 illustrates an example of a path of interpolated points.

As illustrated in FIG. 7, if the interpolated point at the current position is $P_i$, the main controller 11 calculates the position and attitude of the next interpolated point $P_{i+1}$ using the equation: $P_{i+1} = P_0 + \Delta P \times (i+1)$ or $P_{i+1} = P_i + \Delta P$ (step S121). Note that step S121 is an example of an interpolation data calculation step, and the main controller 11 that performs the process in the interpolation data calculation step corresponds to interpolation data calculating means.

Subsequently, the main controller 11 calculates the angles $(\theta_1, \theta_2, \theta_3, \theta_4, \theta_5, \theta_6)$ of the J1 axis 31 to the J6 axis 36 by solving the inverse kinematics problem from the position and attitude $(X_{i+1}, Y_{i+1}, Z_{i+1}, \alpha_{i+1}, \beta_{i+1}, \gamma_{i+1})$ of the next interpolated point $P_{i+1}$ and stores the calculated angles in the storage unit 12 (step S122). At that time, two solutions of the inverse kinematics problem can be obtained for the J4 axis 34 to the J6 axis 36. In this case, from the two solutions of the inverse kinematics problem, the main controller 11 selects the solution in which the sign of the angle of the J5 axis 35 of the first articulated drive system is the same as the sign of the J5 axis 35 at the taught work start point of the end effector 39. In this manner, the angle of the J5 axis 35 does not pass through an angle of 0° and, thus, passage through a singularity can be avoided.

Note that if the main controller 11 performs the speed reduction process (described below), the main controller 11 calculates, in addition to the angles of the J1 axis 31 to the J6 axis 36 at the interpolated point in the path that passes through the singularity, the angles of the J1 axis 31 to the J6 axis 36 at an interpolated point in the path that does not pass through the singularity and stores the angles in the storage unit 12. Thus, the stored angles are used for comparison performed in a return process described below (step S310 in FIG. 5 and a flowchart in FIG. 6).

Note that step S122 is an example of an angle calculation step, and the main controller 11 that performs the angle calculation step corresponds to angle calculating means.

Subsequently, the main controller 11 subtracts the angles of the J4 axis 34 to the J6 axis 36 at the current interpolated point $P_i$ stored in the storage unit 12 from the angles of the J4 axis 34 to the J6 axis 36 at the calculated next interpolated point $P_{i+1}$, respectively, and calculates the speeds of the J4 axis 34 to the J6 axis 36 of the first articulated drive system. Thereafter, the main controller 11 stores the calculated speeds in the storage unit 12 (step S123). Note that as described below, when the speed reduction process (step S20) is performed, the main controller 11 calculates the speeds of the J4 axis 34 to the J6 axis 36 of the first articulated drive system at the interpolated point in a system that passes through a singularity and stores the calculated speeds in the storage unit 12. Thereafter the speeds are used to calculate the allowable range of the speeds in step S131 described below and to calculate the candidates of the speeds (the acceleration as needed) at the next interpolated point in, for example, step S211.

Herein, step S123 is an example of a speed calculation step, and the main controller 11 that performs the speed calculation step corresponds to speed calculating means.

Figure 4:
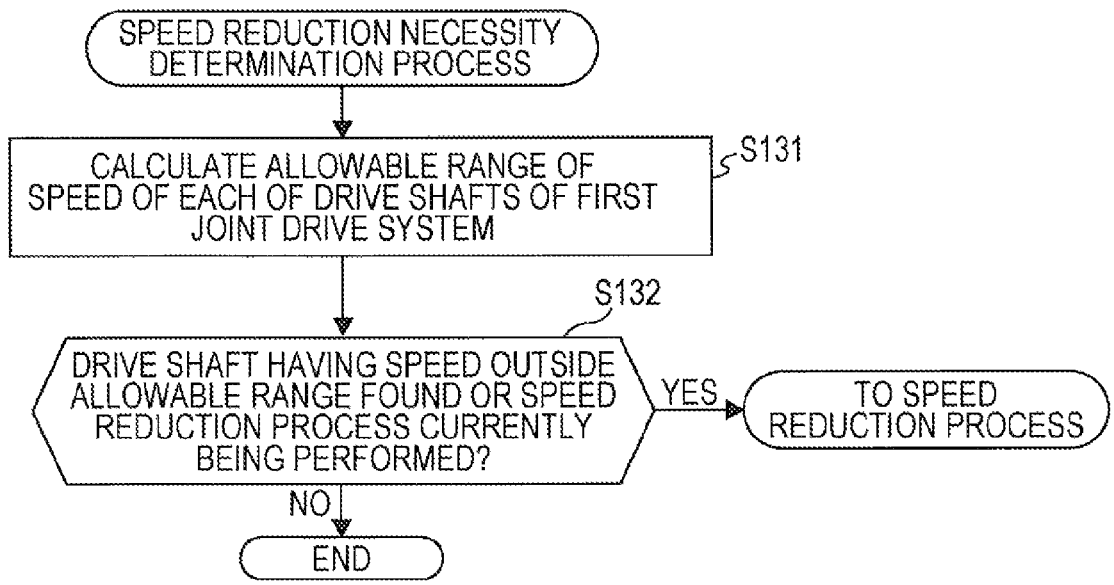
FIG. 4 is a flowchart illustrating an example of a speed reduction necessity determination process.

An example of the speed reduction necessity determination procedure corresponding to step S13 illustrated in FIG. 2 is described next with reference to FIG. 4.

First, the main controller 11 calculates an allowable range of the speeds of the J4 axis 34 and the J6 axis 36 of the first articulated drive system when the position and attitude of the end effector 39 is moved from the current interpolated point $P_i$ to the next interpolated point $P_{i+1}$ (step S131). For example, an upper limit and a lower limit are determined by adding and subtracting a predetermined value or a predetermined ratio to and from the value of the speed at the current interpolated point $P_i$. In this manner, the allowable range of the speed can be calculated. Alternatively, the allowable range of the speed of each of the axes may be determined in advance so as to be within a range that does not have an impact on the quality of the workpiece (e.g., the operating condition of the end effector 39, such as a temperature in the case of welding or a thickness of a coating film in the case of coating, or a condition that avoids an abnormal operation of the articulated robot, such as vibration). Still alternatively, different allowable ranges may be set for the J4 axis 34 and the J6 axis 36.

Subsequently, the main controller 11 determines whether the speed of at least one of the J4 axis 34 and the J6 axis 36 of the first articulated drive system at the next interpolated point exceeds the allowable range or a flag indicating that the speed reduction process is currently being performed is set (step S132).

If the speeds of both of the J4 axis 34 and the J6 axis 36 of the first articulated drive system at the next interpolated point are within the allowable range and the speed reduction process is not currently being performed (NO in step S132), the drive instructing unit 13 reads, from the storage unit 12, the angles of the J1 axis 31 to the J6 axis 36 calculated in step S12 in response to an instruction received from the main controller 11 and outputs the angles to the manipulator body 30 (step S14). However, if an axis having a speed outside the allowable range is present or the speed reduction process is currently being performed (YES in step S132), the main controller 11 performs the speed reduction process (step S20) described below.

A specific example of the speed reduction process of the articulated robot X corresponding to step S20 illustrated in FIG. 2 is described below with reference to FIG. 5.

Figure 24:
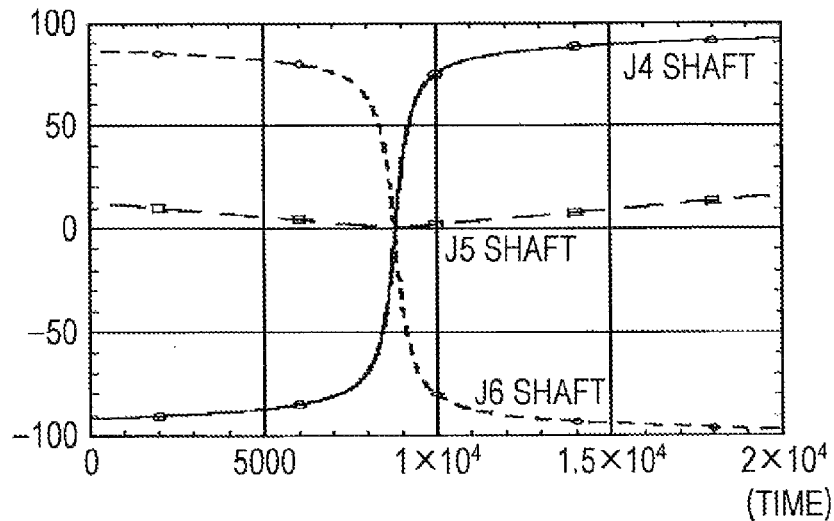
FIG. 24 is a diagram illustrating an example of a variation of the angle of a first joint drive shaft in a path that passes through a singularity in a widely used 6-axis manipulator.

Note that while the following example is described with reference to a speed reduction process performed when the J5 axis 35 illustrated in FIG. 24 is at an angle of about 0 degree and, thus, the speed of the J4 axis 34 or the J6 axis 36 exceeds the allowable range, the same can apply to the case in which the speed of the J4 axis 34 or the J6 axis 36 exceeds the allowable range for another reason. Accordingly, the speed reduction process is performed if the speed of one of the J4 axis 34 and the J6 axis 36 exceeds the allowable range or if the speeds of two of the drive shafts exceed the allowable range. Note that when an axis that is outside the allowable range at the next interpolated point is found for the first time, the speed at the current interpolated point is within the allowable range.

First, if a drive shaft having a speed that is outside the allowable range at the next interpolated point is one of the J4 axis 34 and the J6 axis 36 or each of the J4 axis 34 and the J6 axis 36 or if the flag indicating that the speed reduction process is being performed has already been set, the main controller 11 determines whether the speed reduction process is performed for one of the J4 axis 34 and the J6 axis 36 or both of the J4 axis 34 and the J6 axis 36 so as to branch the processing (step S201). As described above, the determination as to whether the speed is within the allowable range is made by determining whether the speed is between the upper limit and the lower limit. At that time, if the speeds of the J4 axis 34 and the J6 axis 36 are not outside the allowable range and the flag indicating the speed reduction process is currently being performed is not set ("Others" in step S201), the main controller 11 completes the speed reduction process.

However, if the speed of the J6 axis 36 is outside the allowable range, the processing proceeds to step S211. If the speed of the J4 axis 34 is outside the allowable range, the processing proceeds to step S221. If the speeds of the J4 axis 34 and the J6 axis 36 are outside the allowable range, the processing proceeds to step S231.

(Speed Reduction Process Steps S211 to S217 for J6 Axis 36)

If the speed of the J6 axis 36 is outside the allowable range or the flag indicating the speed reduction process for the J6 axis 36 is currently being performed is set ("J6 axis outside range" in step S201), the main controller 11 calculates, on the basis of the angle of the J6 axis 36 at the current interpolated point, a plurality of candidates of the angle of the J6 axis 36 that follow the angle at the next interpolated point calculated in step S12 and that allow the speed of the J6 axis 36 at the next interpolated point to be within the allowable range (step S211).

For example, the main controller 11 calculates candidates of the speed of the J6 axis 36 through the following procedures (21) to (23).

(21) First, the main controller 11 calculates a reduction reference speed V6b using the following equation (21a):

$$V6b = E(\theta_{now} - \theta_{old}) \tag{21a}$$

where $\theta_{now}$ denotes the angle of the J6 axis 36 at the next interpolated point, $\theta_{old}$ denotes the angle of the J6 axis 36 at the current interpolated point, and E denotes a predetermined coefficient (e.g., 0.1).

(22) Subsequently, the main controller 11 determines whether the reduction reference speed V6b is higher than or equal to a speed limiter $V_{max}$. If the reduction reference speed V6b is higher than or equal to the speed limiter $V_{max}$, the reduction reference speed V6b is set to the previous speed $V\theta_{old}$. The speed limiter $V_{max}$ is defined as, for example, the maximum value of a speed within the allowable range.

(23) Subsequently, on the basis of the reduction reference speed V6b and a predetermined value D (e.g., the absolute value of an amount of variation in speed that is known to have acceleration in a predetermined allowable range), the main controller 11 calculates three candidates of the speed ($V\theta_{6a} = V_{6b} - D$, $V\theta_{6b} = V_{6b}$, and $V\theta_{6c} = V_{6b} + D$). For example, the predetermined value D is a value that is about 10% of the speed limiter $V_{max}$. In addition, if $V\theta_{6a}$ is higher than the speed limiter $V_{max}$, $V\theta_{6a}$ is set to $V_{max}$.

Thereafter, the main controller 11 calculates, from the angle θ6 of the J6 axis 36 at the current interpolated point, three candidates of the angle of the J6 axis 36 ($\theta_{6a}$, $\theta_{6b}$, $\theta_{6c}$) at the next interpolated point corresponding to the above-described candidates of the speed ($V\theta_{6a}$, $V\theta_{6b}$, $V\theta_{6c}$). That is, as the next interpolated point, the following angles are calculated: the angle that maintains the reduction reference speed V6b that does not exceed at least the allowable range or the speed at the current interpolated point (it is obvious that the speed is within the allowable range), and the angles that are deviated from the angle by a slight amount (±D (corresponding to the absolute value of an amount of variation of the speed)). Note that the process performed in step S211 is an example of an angle candidate calculation step, and the main controller 11 that performs the process corresponds to angle candidate calculating means.

Subsequently, the main controller 11 calculates the angles of the other J1 axis 31 to J5 axis 35 at the next interpolated point, corresponding to each of the calculated candidates of the angle of the J6 axis 36 (step S212). For example, as indicated by the following operations (1) to (3), by using the position $(X_{i+1}, Y_{i+1}, Z_{i+1})$ of the end effector 39 at the next interpolated point $P_{i+1}$ calculated in step S122 and the angles $(\theta_4, \theta_5)$ of the J4 axis 34 and the J5 axis 35 of the first articulated drive system, the main controller 11 recalculates the angles $(\theta_1, \theta_2, \theta_3, \theta_4, \theta_5, \theta_6)$ of the J1 axis 31 to the J6 axis 36 of the first articulated drive system and the second articulated drive system for each of the candidates of the angle $(\theta_{6a}, \theta_{6b}, \theta_{6c})$ of the J6 axis 36.

(1) Calculating $[\theta_{1a}, \theta_{2a}, \theta_{3a}, \theta_4, \theta_5, \theta_{6a}]$ from $[X_{i+1}, Y_{i+1}, Z_{i+1}, \theta_4, \theta_5, \theta_{6a}]$ for the candidate $\theta_{6a}$.
(2) Calculating $[\theta_{1b}, \theta_{2b}, \theta_{3b}, \theta_4, \theta_5, \theta_{6b}]$ from $[X_{i+1}, Y_{i+1}, Z_{i+1}, \theta_4, \theta_6, \theta_{6b}]$ for the candidate $\theta_{6b}$.
(3) Calculating $[\theta_{1c}, \theta_{2c}, \theta_{3c}, \theta_4, \theta_6, \theta_{6c}]$ from $[X_{i+1}, Y_{i+1}, Z_{i+1}, \theta_4, \theta_5, \theta_{6c}]$ for the candidate $\theta_{6c}$.

In this manner, as illustrated in FIG. 8 described below, a candidate $P'_{i+1}$ of the next interpolated point at which the speed does not exceed the allowable range is calculated. By regarding the candidate $P'_{i+1}$ of the next interpolated point as the next interpolated point, an exception path (refer to FIG. 8(B)) in which the speed of the J6 axis 36 does not exceed the allowable range and which avoids the original interpolated point $P_{i+1}$ (the singularity) can be obtained.

After the three candidates of the angle $(\theta_{6a}, \theta_{6b}, \theta_{6c})$ at the next interpolated point at which the speed of the J6 axis 36 is maintained within the allowable range are obtained in this manner, determination as to which one of the candidates is selected for the next interpolated point is made. Although the angles $(\theta_4, \theta_5, \theta_6)$ of the J4 axis 34 to the J6 axis 36 of the first articulated drive system are of interest in the above-described calculation, one of the candidates needs to be finally selected with a focus on the attitude of the end effector 39 that is important for a desired task. Accordingly, the angles of the J1 axis 31 to the J6 axis 36 need to be converted into data defining the attitude of the end effector 39.

Figure 25:
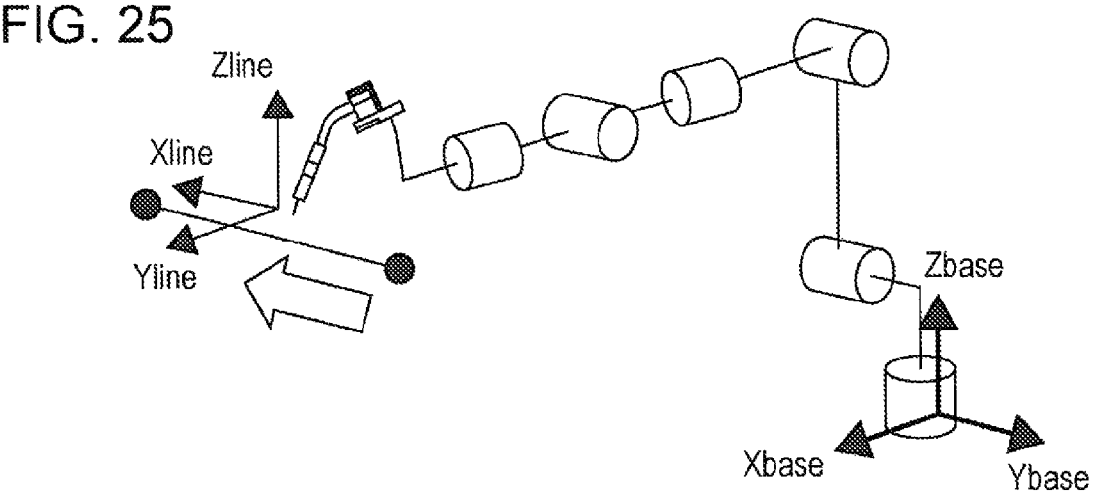
FIG. 25 illustrates an example of conversion from a coordinate system defining the position and attitude of an end effector of a widely used 6-axis manipulator into a welding line coordinate system.
Figure 26:
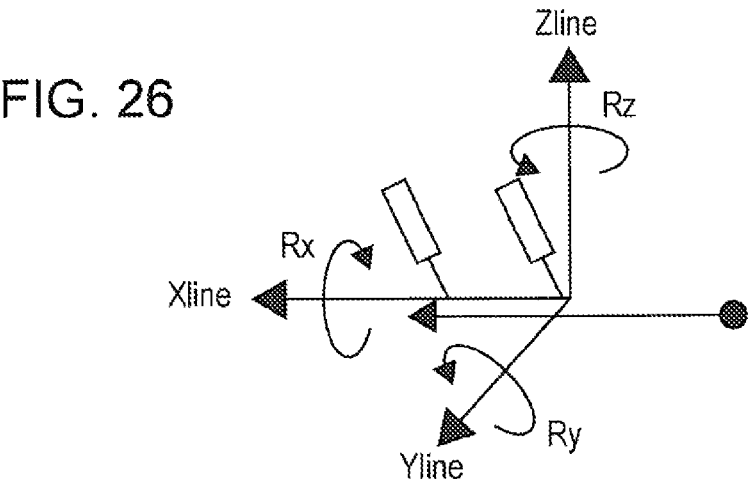
FIG. 26 illustrates an example of an inclination component of each of the axes in the welding line coordinate system.
Figure 27:
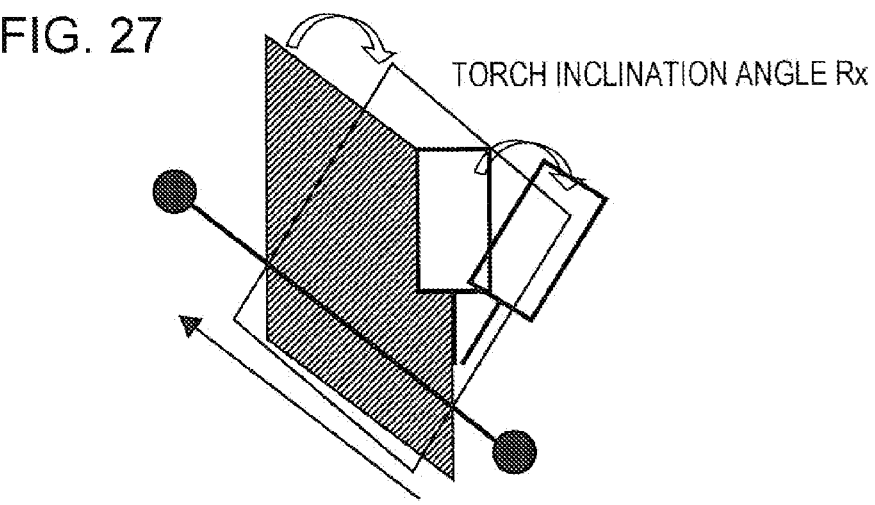
FIG. 27 illustrates an example of a torch inclination angle in the welding line coordinate system.
Figure 28:
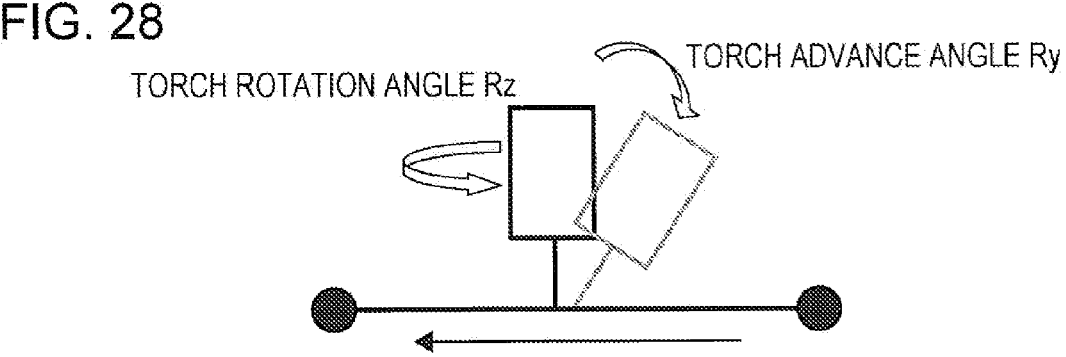
FIG. 28 illustrates an example of a torch forward tilting angle and a torch rotation angle in the welding line coordinate system.

Thereafter, in order to determine which one of the candidates is selected as the next interpolated point, the main controller 11 calculates the components of data (torch inclination angle Rx, torch forward tilting angle Ry, torch rotation angle Rz) defining the attitude of the end effector 39 in the weld line coordinate system Σline at the next interpolated point for each of the calculated candidates (step S213). Note that the process performed in step S213 is an example of an attitude data calculation step, and the main controller 11 that performs the process in the attitude data calculation step corresponds to attitude data calculating means. Also note that as illustrated in FIG. 25, the weld line coordinate system Σline is a work coordinate system having an X-axis extending in the direction in which the end effector 39 moves (a direction of movement), a Y-axis defined as a cross product of the X-axis and the direction of gravitational force (X-axis×direction of gravitational force), and a Z-axis defined as a cross product of the X-axis and the Y-axis (X-axis and ×Y-axis). As illustrated in FIGS. 26 to 28, the rotation angle about the X-axis is expressed by the torch inclination angle Rx, the rotation angle about the Y-axis is expressed by the torch forward tilting angle Ry, the rotation angle about the Z-axis is expressed by the torch rotation angle Rz. For example, the main controller 11 calculates the components of the data representing the attitude of the end effector 39 for the candidates $\theta_{6a}$ to $\theta_{6c}$ in the above-described operations (1) to (3) through the following operations (1') to (3'), respectively:

(1') Calculating $[R_{xa}, R_{ya}, R_{za}]$ from $[\theta_{1a}, \theta_{2a}, \theta_{3a}, \theta_4, \theta_5, \theta_{6a}]$,
(2') Calculating $[R_{xb}, R_{yb}, R_{zb}]$ from $[\theta_{1b}, \theta_{2b}, \theta_{3b}, \theta_4, \theta_5, \theta_{6b}]$, and
(3') Calculating $[R_{xc}, R_{yc}, R_{zc}]$ from $[\theta_{1c}, \theta_{2c}, \theta_{3c}, \theta_4, \theta_5, \theta_{6c}]$.

Subsequently, the main controller 11 converts data in order to convert the position and attitude $(X_{i+1}, Y_{i+1}, Z_{i+1}, \alpha_{i+1}, \beta_{i+1}, \gamma_{i+1})$ of the end effector 39 at the interpolated point $P_{i+1}$ in the original path calculated in step S121 in an orthogonal coordinate system Σbase into data in the weld line coordinate system Σline (the torch inclination angle Rx, the torch forward tilting angle Ry, the torch rotation angle Rz) in which the X-axis represents a direction in which the end effector 39 moves (step S214). Note that the process performed in step S214 is an example of an attitude data conversion step, and the main controller 11 that performs the process in the attitude data conversion step corresponds to attitude data converting means.

Also note that the equation for converting the orthogonal coordinate system Σbase into the weld line coordinate system Σline is given as the following equation (Math 1).

[Math. 1]

$$^{line}R_{total} = \begin{bmatrix} 1 & 0 & 0 \\ 0 & \cos Rx & -\sin Rx \\ 0 & \sin Rx & \cos Rx \end{bmatrix} \begin{bmatrix} \cos Ry & 0 & \sin Ry \\ 0 & 1 & 0 \\ -\sin Ry & 0 & \cos Ry \end{bmatrix} \begin{bmatrix} \cos Rz & -\sin Rz & 0 \\ \sin Rz & \cos Rz & 0 \\ 0 & 0 & 1 \end{bmatrix}$$

$$= \begin{bmatrix} \cos Ry \cos Rz & -\cos Ry \sin Rz & \sin Ry \\ \sin Rx \sin Ry \cos Rz + \cos Rx \sin Rz & -\sin Rx \sin Ry \sin Rz + \cos Rx \cos Rz & -\sin Rx \cos Ry \\ -\cos Rx \sin Ry \cos Rz + \sin Rx \sin Rz & \cos Rx \sin Ry \sin Rz + \sin Rx \cos Rz & \cos Rx \cos Ry \end{bmatrix}$$

By using $\alpha$, $\beta$, and $\gamma$, the following equations can be obtained:

$$^{base}R_{tool} = \begin{bmatrix} \cos \alpha & -\sin \alpha & 0 \\ \sin \alpha & \cos \alpha & 0 \\ 0 & 0 & 1 \end{bmatrix} \begin{bmatrix} \cos \beta & 0 & \sin \beta \\ 0 & 1 & 0 \\ -\sin \beta & 0 & \cos \beta \end{bmatrix} \begin{bmatrix} 1 & 0 & 0 \\ 0 & \cos \gamma & -\sin \gamma \\ 0 & \sin \gamma & \cos \gamma \end{bmatrix},$$

-continued $$_{base}R_{line} = \begin{bmatrix} Xm[x] & Ym[x] & Zm[x] \\ Xm[y] & Ym[y] & Zm[y] \\ Xm[z] & Ym[z] & Zm[z] \end{bmatrix}$$

By computing the following equation:

$$_{line}R_{tool} = {}_{line}R_{base} \cdot {}_{base}R_{tool}$$
$$= {}_{base}R_{line}^T \cdot {}_{base}R_{tool}$$
$$= \begin{bmatrix} Rm11 & Rm12 & Rm13 \\ Rm21 & Rm22 & Rm23 \\ Rm31 & Rm32 & Rm33 \end{bmatrix},$$

Rx, Ry, and Rz can be obtained as follows:

$Rx = a\tan(Rm23/Rm33)$, $Ry = a\sin(Rm13)$, $Rz = a\tan(Rm12/Rm11)$

The speed of the J6 axis 36 is originally outside the allowable range. Accordingly, in order to maintain the trajectory and reduce the speed of the J6 axis 36, the amount of variation corresponding to the excess speed of the J6 axis 36 needs to be reduced by selecting at least one of the J1 axis 31 to the J5 axis 35 (other than the J6 axis 36) which is further rotatable and rotating the selected axis more. Unfortunately, determination as to which one of the J1 axis 31 to the J5 axis 35 is further rotatable with the trajectory unchanged cannot be made from a region defined by the angles θ1 to θ6. In contrast, in a region defined by the components (Rx, Ry, Rz) of the weld line coordinate system θline that is closely related to the type of task of the end effector 39, which one of the J1 axis 31 to the J5 axis 35 is further rotatable with the trajectory unchanged can be determined.

Figure 5:
FIG. 5 is a flowchart of an example of a speed reduction process.

Accordingly, as illustrated in FIG. 5, the main controller 11 acquires information (weight information) indicating a component having variation to be reduced from among the components (torch inclination angle Rx, torch forward tilting angle Ry, torch rotation angle Rz) of data indicating the attitude of the end effector 39 in the weld line coordinate system Σline converted in step S213 (step S215). Note that the main controller 11 may freely determine which one of the components has an increased weight using an input through the operation unit 21. For example, according to the present embodiment, the end effector 39 is a welding torch having a single work point. Because of the nature of a welding task using a welding torch, the angle of the torch with respect to the workpiece (the material) and the moving speed of the torch are important. In contrast, rotation about the axis of the torch is not important. Thus, according to the present embodiment, it is assumed that the weight information is predetermined so that the torch inclination angle Rx and the torch forward tilting angle Ry are components having a large weight (i.e., components to be reduced), and the torch forward tilting angle Ry is a component having a small weight (i.e., a component that is not to be reduced). The weight information is used in the form of coefficients for the components of the evaluation equation used to select a candidate having a reduced variation in step S216 described below.

Subsequently, from among the plurality of calculated candidates at the next interpolated point, the main controller 11 selects a candidate having the smallest variation of a particular component (one or two of the torch inclination angle Rx, the torch forward tilting angle Ry, and the torch rotation angle Rz) having a large weight for reduction obtained in step S215 (step S216). For example, when variations of the torch inclination angle and the torch forward tilting angle are reduced and a variation of the torch rotation angle is allowed, weighting coefficients A, B, and C are set so that A=1, B=1, and C=0 (i.e., the particular components are the torch inclination angle and the torch forward tilting angle). Thereafter, the following calculations (1") to (3") are performed for the candidates in the above-described operations (1') to (3'), respectively:

(1") $[Fa = A(Rx - R_{xa})^2 + B(Ry - R_{ya})^2 + C(Rz - R_{za})^2]$,
(2") $[Fb = A(Rx - R_{xb})^2 + B(Ry - R_{yb})^2 + C(Rz - R_{zb})^2]$, and
(3") $[Fc = A(Rx - R_{xc})^2 + B(Ry - R_{yc})^2 + C(Rz - R_{zc})^2]$, where Rx, Ry, and Rz denote the torch inclination angle, the torch forward tilting angle, and the torch rotation angle at the next interpolated point in the original path.

By weighting the components whose variations are to be reduced in the above-described steps (1") to (3"), differences Fa to Fc between the attitude angles of the end effector 39 at the next interpolated point in the original path calculated in step S214 and the attitude angles of the end effector 39 of the candidates at the next interpolated point in the exception path calculated in step S213 can be obtained. Thereafter, among Fa to Fc, the smallest value (the smallest variation) is selected, and the angles of the J1 axis 31 to the J6 axis 36 for the selected candidate are employed as the angles of the axes in the operation for avoiding a singularity. Note that the process performed in step S216 is an example of an angle selection step, and the main controller 11 that performs the process in the angle selection step corresponds to angle selecting means. In addition, the main controller 11 stores the angles of the J1 axis 31 to the J6 axis 36 of the selected candidate and the speed of the J6 axis 36 in the storage unit 12. In this manner, the angles of the J1 axis 31 to the J6 axis 36 are recalculated so that among the components of the attitude data of the end effector 39, as a component has a higher predetermined weight, an amount of reduction in variation of the component is higher. For example, if the weighting coefficient A=0.2, the weighting coefficient B=0, and the weighting coefficient C=1, then the variation of the torch rotation angle Rz is reduced the most, and the variation of the torch forward tilting angle Ry is the largest.

Subsequently, if the flag indicating that the speed reduction process is currently being performed for the J6 axis 36 is not set, the main controller 11 sets the flag so as to indicate that the speed reduction process is currently being performed for the J6 axis 36 (step S217).

Note that steps S211 to S213 and steps S216 and S217 are an example of a recalculation step, and the main controller 11 that performs the process in the steps corresponds to recalculating means.

As illustrated in FIGS. 8(A) and 8(B), by performing the above-described process (steps S211 to S217), the next interpolated point $P'_{i+1}$ in the exception path that avoids a singularity can be found from the position $P_i$ of the current interpolated point, instead of the next interpolated point $P_{i+1}$ in the original path that passes through the singularity.

Such calculation (step S201 and steps S211 to S217) is repeated until the next interpolated point becomes an interpolated point of the original path ("Others" in step S201). Thus, an exception path that avoids a singularity is calculated. Note that the control unit 10 does not perform such calculation processes in one go in advance. The processes are performed by the main controller 11 as needed in accordance with the current state and the next state. Accordingly, the processing load instantaneously imposed on the main controller 11 is reduced and, therefore, the cost can be reduced.

Note that among the candidates of angles ($\theta_{6a}$, $\theta_{6b}$, $\theta_{6c}$) at the next interpolated point, the angle of the J6 axis 86 at the reduction reference speed V6b that is originally within the allowable range or at the current interpolated point is included. Accordingly, the speed of the J6 axis 36 at the next interpolated point can be maintained within the allowable range using any one of the candidates employed.

A return process (step S310) of the J6 axis 36 from the speed reduction process subsequently performed by the main controller 11 is described in detail below.

(J4-Axis-34 Speed Reduction Process Steps S221 to S227)

If the speed of the J4 axis 34 is outside the allowable range or the flag indicating that the speed reduction process for the J4 axis 34 is currently being performed is set ("J4 Axis outside range" in step S201), the main controller 11 calculates a plurality of candidates of the angle of the J4 axis 34 that are within the allowable range in the same manner as in the above-described calculation of the candidates of the speed and angle of the J6 axis 86 (step S221). That is, a reduction reference speed $V_{4b}$ of the J4 axis 34 is calculated. Thereafter, three candidates of the speed ($V\theta_{4a}=V_{4b}-G$, $V\theta_{4b}=V_{4b}$, $V\theta_{4c}=V_{4b}+G$) are calculated, and three candidates of the angle ($\theta_{4a}$, $\theta_{4b}$, $\theta_{4c}$) are calculated. Note that the predetermined value G is, for example, the absolute value of an amount of variation of speed that is known to maintain acceleration within a predetermined allowable range. Also note that the process performed in step S221 is an example of the angle candidate calculation step.

The processes in steps S222 to S227 and step S320 below are the same as those in steps S212 to S217 and step S310 described above for the J6 axis 36, respectively. Accordingly, descriptions of the processes in steps S222 to S227 and step S320 are not repeated.

(J4-Axis 34 and J6-Axis 36 Speed Reduction Process Step S231 to S237)

If the speeds of the J4 axis 34 and the J6 axis 36 are within the allowable range or if the flag indicating that the speed reduction process is currently being performed for the J4 axis 34 is set and the flag indicating that the speed reduction process is currently being performed is set for the J6 axis 36 ("J4 axis/J6 axis outside range" in step S201), the main controller 11 calculates one or a plurality of candidates of the speed and angle of each of the J4 axis 34 and the J6 axis 36 (step S231).

For example, in step S231, three candidates of the speed of the J6 axis 36 can be calculated as in step S211, and three candidates of the speed of the J4 axis 34 can be calculated as in step S221. Thereafter, the three candidates for the J4 axis 34 and the three candidates for the J6 axis 36 can be combined into nine candidates. That is, the main controller 11 generates three speed candidates ($V\theta_{6a}=V_{6b}-D$, $V\theta_{6b}=V_{6b}$, $V\theta_{6c}=V_{6b}+D$) from the reduction reference speed V6b of the J6 axis 36 and the predetermined value D and generates three speed candidates ($V\theta_{4a}=V_{4b}-G$, $V\theta_{4b}=V_{4b}$, $V\theta_{4c}=V_{4b}+G$) from the reduction reference speed $V_{4b}$ of the J4 axis 34 and the predetermined value G. Furthermore, the main controller 11 calculates three candidates of the angle of the J6 axis 36 ($\theta_{6a}$, $\theta_{6b}$, $\theta_{6c}$) at the next interpolated point corresponding to the above-described speed candidates from the angle $\theta_6$ of the J6 axis 36 at the current interpolated point and calculates three candidates of the angle of the J4 axis 34 ($\theta_{4a}$, $\theta_{4b}$, $\theta_{4c}$) at the next interpolated point corresponding to the above-described speed candidates from the angle $\theta_4$ of the J4 axis 34 at the current interpolated point. Thereafter, the main controller 11 combines the candidates for the J4 axis 34 and the candidates for the J6 axis 36 so as to calculate nine candidates ($\theta_{4a}$, $\theta_{6a}$), ($\theta_{4a}$, $\theta_{6b}$), ($\theta_{4a}$, $\theta_{6c}$), ($\theta_{4b}$, $\theta_{6a}$), ($\theta_{4b}$, $\theta_{6b}$), ($\theta_{4b}$, $\theta_{6c}$), ($\theta_{4c}$, $\theta_{6a}$), ($\theta_{4c}$, $\theta_{6b}$), and ($\theta_{4c}$, $\theta_{6c}$). That is, for each of the J4 axis 34 and the J6 axis 36 at the next interpolated point, the angle that maintains the speed that does not exceed the allowable range at the current interpolated point and the angle that is slightly deviated from the angle due to the angle are calculated. Note that the process performed in step S231 is an example of the angle candidate calculation step.

Subsequently, the main controller 11 calculates the angles of the other axes (the J1 axis 31 to the J3 axis 83 and the J5 axis 35) corresponding to each of the calculated candidates of the angles of the J4 axis 34 and the J6 axis 36 at the next interpolated point (step S232). For example, for each of the pairs of candidates ($\theta_{4a}$, $\theta_{6a}$) to ($\theta_{4c}$, $\theta_{6c}$) for the J4 axis 34 and the J6 axis 36, the main controller 11 recalculates the angles ($\theta_1$, $\theta_2$, $\theta_3$) of the J1 axis 81 to the J3 axis 33 of the second articulated drive system using the position ($X_{i+1}$, $Y_{i+1}$, $Z_{i+1}$) of the end effector 39 at the next interpolated point $P_{i+1}$ calculated in step S122 and the angle ($\theta_5$) of the J5 axis 35 of the first articulated drive system.

(1) For the candidate ($\theta_{4a}$, $\theta_{6a}$), calculating [$\theta_{1aa}$, $\theta_{2aa}$, $\theta_{3aa}$, $\theta_{4a}$, $\theta_5$, $\theta_{6a}$] from [$X_{i+1}$, $Y_{i+1}$, $Z_{i+1}$, $\theta_{4a}$, $\theta_5$, $\theta_{6a}$]
(2) For the candidate ($\theta_{4a}$, $\theta_{6b}$), calculating [$\theta_{1ab}$, $\theta_{2ab}$, $\theta_{3ab}$, $\theta_{4a}$, $\theta_5$, $\theta_{6b}$] from [$X_{i+1}$, $Y_{i+1}$, $Z_{i+1}$, $\theta_{4a}$, $\theta_5$, $\theta_{6b}$]
(3) For the candidate ($\theta_{4a}$, $\theta_{6c}$), calculating [$\theta_{1ac}$, $\theta_{2ac}$, $\theta_{3ac}$, $\theta_{4a}$, $\theta_5$, $\theta_{6c}$] from [$X_{i+1}$, $Y_{i+1}$, $Z_{i+1}$, $\theta_{4a}$, $\theta_5$, $\theta_{6c}$]
(4) For the candidate ($\theta_{4a}$, $\theta_{6a}$), calculating [$\theta_{1ba}$, $\theta_{2ba}$, $\theta_{3ba}$, $\theta_{4b}$, $\theta_5$, $\theta_{6a}$] from [$X_{i+1}$, $Y_{i+1}$, $Z_{i+1}$, $\theta_{4b}$, $\theta_5$, $\theta_{6a}$]
(5) For the candidate ($\theta_{4b}$, $\theta_{6b}$), calculating [$\theta_{1bb}$, $\theta_{2bb}$, $\theta_{3bb}$, $\theta_{4b}$, $\theta_5$, $\theta_{6a}$] from [$X_{i+1}$, $Y_{i+1}$, $Z_{i+1}$, $\theta_{4b}$, $\theta_5$, $\theta_{6b}$]
(6) For the candidate ($\theta_{4b}$, $\theta_{6c}$), calculating [$\theta_{1bc}$, $\theta_{2bc}$, $\theta_{3bc}$, $\theta_{4b}$, $\theta_5$, $\theta_{6c}$] from [$X_{i+1}$, $Y_{i+1}$, $Z_{i+1}$, $\theta_{4b}$, $\theta_5$, $\theta_{6c}$]
(7) For the candidate ($\theta_{4c}$, $\theta_{6a}$), calculating [$\theta_{1ca}$, $\theta_{2ca}$, $\theta_{3ca}$, $\theta_{4c}$, $\theta_5$, $\theta_{6a}$] from [$X_{i+1}$, $Y_{i+1}$, $Z_{i+1}$, $\theta_{4c}$, $\theta_5$, $\theta_{6a}$]
(8) For the candidate ($\theta_{4c}$, $\theta_{6b}$), calculating [$\theta_{1cb}$, $\theta_{2cb}$, $\theta_{3cb}$, $\theta_{4b}$, $\theta_5$, $\theta_{6b}$] from [$X_{i+1}$, $Y_{i+1}$, $Z_{i+1}$, $\theta_{4c}$, $\theta_5$, $\theta_{6b}$]
(9) For the candidate ($\theta_{4c}$, $\theta_{6c}$), calculating [$\theta_{1cc}$, $\theta_{2cc}$, $\theta_{3cc}$, $\theta_{4c}$, $\theta_5$, $\theta_{6c}$] from [$X_{i+1}$, $Y_{i+1}$, $Z_{i+1}$, $\theta_{4c}$, $\theta_5$, $\theta_{6c}$]

In this manner, the candidate $P'_{i+1}$ having a speed that does not exceed the allowable range for the next interpolated point can be calculated. By regarding the candidate $P'_{i+1}$ of the next interpolated point as the next interpolated point, an exception path that does not exceed the allowable range and that avoids the next interpolated point $P_{i+1}$ (a singularity) can be obtained.

Subsequently, in order to select a candidate with a focus on the attitude of the end effector 39, the candidates of the angles of the J1 axis 31 to the J6 axis 36 are converted into data defining the attitude of the end effector 39.

More specifically, the main controller 11 calculates the components of data (torch inclination angle Rx, torch forward tilting angle Ry, torch rotation angle Rz) defining the attitude of the end effector 39 in the weld line coordinate system at the calculated next interpolated point (step S233).

For example, the main controller 11 calculates the components of the data representing the attitude of the end effector 39 for the candidates of the angles in the above-described operations (1) to (9) through the following operations (1') to (9'):

(1') Calculating [($R_{xaa}$, $R_{yaa}$, $R_{zaa}$] from [$\theta_{1aa}$, $\theta_{2aa}$, $\theta_{3aa}$, $\theta_{4a}$, $\theta_5$, $\theta_{6a}$],
(2') Calculating [($R_{xab}$, $R_{yab}$, $R_{zab}$] from [$\theta_{1ab}$, $\theta_{2ab}$, $\theta_{3ab}$, $\theta_{4a}$, $\theta_5$, $\theta_{6b}$], (3') Calculating $[(R_{xac}, R_{yac}, R_{zac}]$ from $[\theta_{1ac}, \theta_{2ac}, \theta_{3ac}, \theta_{4a}, \theta_5, \theta_{6c}]$,
(4') Calculating $[(R_{xba}, R_{yba}, R_{zba}]$ from $[\theta_{1ba}, \theta_{2ba}, \theta_{3ba}, \theta_{4b}, \theta_5, \theta_{6a}]$,
(5') Calculating $[(R_{xbb}, R_{ybb}, R_{zbb}]$ from $[\theta_{1bb}, \theta_{2bb}, \theta_{3bb}, \theta_{4b}, \theta_5, \theta_{6b}]$,
(6') Calculating $[(R_{xbc}, R_{ybc}, R_{zbc}]$ from $[\theta_{1bc}, \theta_{2bc}, \theta_{3bc}, \theta_{4b}, \theta_5, \theta_{6c}]$,
(7') Calculating $[(R_{xca}, R_{yca}, R_{zca}]$ from $[\theta_{1ca}, \theta_{2ca}, \theta_{3ca}, \theta_{4c}, \theta_5, \theta_{6a}]$,
(8') Calculating $[(R_{xcb}, R_{ycb}, R_{zcb}]$ from $[\theta_{1cb}, \theta_{2cb}, \theta_{3cb}, \theta_{4c}, \theta_5, \theta_{6b}]$, and
(9') Calculating $[(R_{xcc}, R_{ycc}, R_{zcc}]$ from $[\theta_{1cc}, \theta_{2cc}, \theta_{3cc}, \theta_{4c}, \theta_5, \theta_{6c}]$.

Thereafter, the main controller 11 calculates the components of data (torch inclination angle Rx, torch forward tilting angle Ry, torch rotation angle Rz) defining the attitude of the end effector 39 in the weld line coordinate system at the next interpolated point $P_{i+1}$ calculated in step S234 (step S234). Note that step S234 is an example of the attitude data conversion step, and the main controller 11 that performs the process in the attitude data conversion step corresponds to the attitude data converting means.

Subsequently, from among the plurality of components (torch inclination angle Rx, torch forward tilting angle Ry, torch rotation angle Rz) of the data defining the attitude of the end effector 39 in the weld line coordinate system Σline converted in step S233, the main controller 11 acquires information (weight information) indicating a component having a variation that is to be reduced (step S235).

Furthermore, from among the plurality of calculated candidates at the next interpolated point, the main controller 11 selects a candidate having the smallest variation of a particular component (one of the torch inclination angle Rx, the torch forward tilting angle Ry, and the torch rotation angle Rz) having a large weight for reduction obtained in step S235 (step S236). For example, when variation of the torch inclination angle and variation of the torch forward tilting angle are reduced but a variation of the torch rotation angle is allowed, then the weighting coefficients are set so that A=1, B=1, and C=0. Thereafter, the following operations (1") to (9") are performed for the candidates in the above-described operations (1') to (9'), respectively:

(1") $[F_{aa}=A(Rx-R_{xaa})^2+B(Ry-R_{yaa})^2+C(Rz-R_{zaa})^2]$,
(2") $[F_{ab}=A(Rx-R_{xab})^2+B(Ry-R_{yab})^2+C(Rz-R_{zab})^2]$,
(3") $[F_{ac}=A(Rx-R_{xac})^2+B(Ry-R_{yac})^2+C(Rz-R_{zac})^2]$,
(4") $[F_{ba}=A(Rx-R_{xba})^2+B(Ry-R_{yba})^2+C(Rz-R_{zba})^2]$,
(5") $[F_{bb}=A(Rx-R_{xbb})^2+B(Ry-R_{ybb})^2+C(Rz-R_{zbb})^2]$,
(6") $[F_{bc}=A(Rx-R_{xbc})^2+B(Ry-R_{ybc})^2+C(Rz-R_{zbc})^2]$,
(7") $[F_{ca}=A(Rx-R_{xca})^2+B(Ry-R_{yca})^2+C(Rz-R_{zca})^2]$,
(8") $[F_{cb}=A(Rx-R_{xcb})^2+B(Ry-R_{ycb})^2+C(Rz-R_{zcb})^2]$, and
(9") $[F_{cc}=A(Rx-R_{xcc})^2+B(Ry-R_{ycc})^2+C(Rz-R_{zcc})^2]$.

By weighting the components whose variations are to be reduced in the above-described steps (1") to (9"), differences $F_{aa}$ to $F_{cc}$ between the attitude angles of the end effector 39 at the next interpolated point in the original path calculated in step S234 and the attitude angles of the end effector 39 at the next interpolated point in the exception path calculated in step S233 can be obtained. Thereafter, among the differences $F_{aa}$ to $F_{cc}$, the smallest value (the smallest variation) is selected, and the angles of the J1 axis 31 to the J6 axis 36 for the selected candidate are employed as the angles of the axes in the operation for avoiding the singularity. Note that the process performed in step S236 is an example of the angle selection step, and the main controller 11 that performs the process in the angle selection step corresponds to the angle selecting means. In addition, the main controller 11 stores the angles of the J1 axis 31 to the J6 axis 36 of the selected candidate and the speeds of the J4 axis 34 and the J6 axis 36 in the storage unit 12.

Subsequently, if the flags indicating that the speed reduction process is currently being performed for the J4 axis 34 and the J6 axis 36 are not set, the main controller 11 sets the flags so as to indicate that the speed reduction process is currently being performed for the J4 axis 34 and the J6 axis 36 (step S237).

By performing the above-described process (steps S231 to S237), the next interpolated point $P'_{i+1}$ in the exception path that avoids the singularity can be found from the position $P_i$ of the current interpolated point, instead of the next interpolated point $P_{i+1}$ in the original path that passes through the singularity.

A return process (step S330) of the J4 axis 34 and the J6 axis 36 from the speed reduction process subsequently performed by the main controller 11 is described in detail below.

Figure 6:
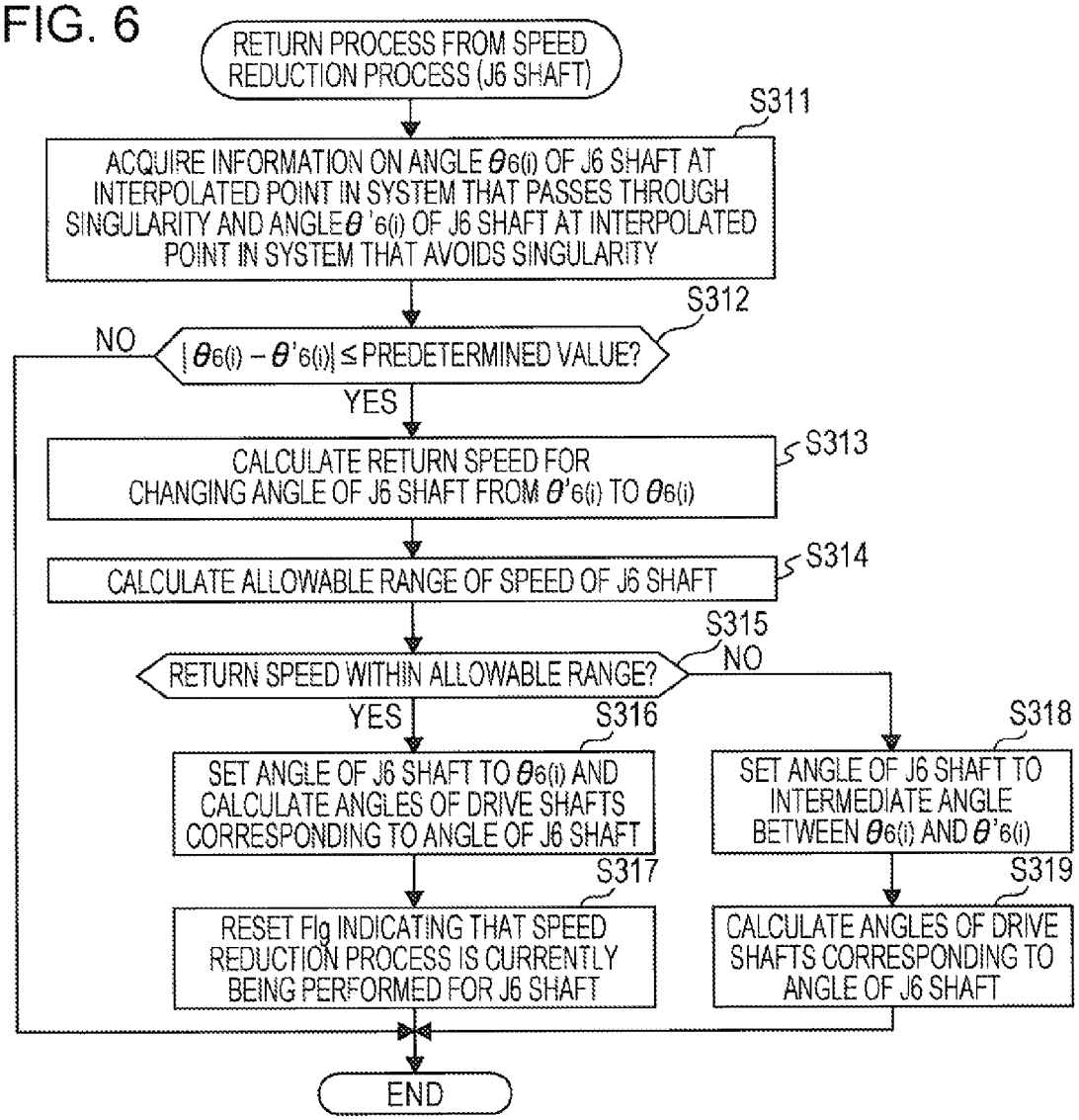
FIG. 6 is a flowchart of an example of a return process from the speed reduction process.

An example of the procedure of a return process from the speed reduction process of the articulated robot X corresponding to step S310 illustrated in FIG. 5 is described next with reference to FIG. 6.

As illustrated in FIG. 8(B), the main controller 11 calculates, from the next interpolated point $P'_{i+1}$ in the exception path that avoids a singularity zone $P_i$ to $P_{i+1}$, a difference between the angle at an interpolated point $P_{i+2}$ after next in the original path that passes through the singularity and the angle at an interpolated point $P'_{i+2}$ after next in the exception path that avoids the singularity. If the difference does not exceed a predetermined range, the processing proceeds to $P_{i+3}$, where the processing is completed. However, if the difference exceeds the predetermined range, the processing proceeds to $P'_{i+3}$. This processing is repeated as long as the difference exceeds the predetermined range. If finally, the next interpolated point at which the difference is within the predetermined range is found ($P'_{i+4}$ to $P'_{i+5}$ in this example), the processing proceeds from the interpolated point $P'_{i+4}$ to the interpolated point $P_{i+5}$, where the processing is completed. Accordingly, the case in which return from the current interpolated point $P'_{i+4}$ in the path that avoids the singularity to the next interpolated point $P_{i+5}$ in the path that passes through the singularity is mainly described next.

(Return Process of J6 Axis 36 from Speed Reduction Process)

First, the main controller 11 acquires an angle $\theta_{6(i+5)}$ of the J6 axis 36 at the next interpolated point $P_{i+5}$ in the system that passes through the singularity calculated in step S122 and an angle $\theta'_{6(i+5)}$ of the J6 axis 36 at the next interpolated point $P'_{i+5}$ in the system that avoids the singularity selected in step S214 (step S311).

Subsequently, the main controller 11 determines whether a difference between the angle $\theta'_{6(i+5)}$ of the J6 axis 36 of the system that avoid the singularity and the angle $\theta_{6(i+5)}$ of the J6 axis 36 of the system that passes through the singularity is within the predetermined range (step S312). Note that the predetermined range is determined to be an angle difference value within a range in which if the angle $\theta'_{6(i+5)}$ of the J6 axis 36 is replaced with the angle $\theta_{6(i+5)}$ and the end effector 39 is operated, an adverse effect on the operation, such as vibration, does not occur, in general. That is, the main controller 11 determines whether the interpolated point in the path that avoid the singularity is sufficiently close to an interpolated point in the original path that passes through the singularity and is within a range in which the interpolated point in the path that avoids the singularity is considered to return to the interpolated point in the original path.

Accordingly, if the difference value exceeds the predetermined range (NO in step S312), the main controller 11 completes the return process in step S310. Thereafter, the processing proceeds to step S14 (refer to FIG. 2). If the difference value is within a predetermined range (YES in step S312), the main controller 11 calculates the speed when the angle $\theta'_{6(i+5)}$ of the J6 axis 36 is replaced with the angle $\theta_{6(i+5)}$ (step S313). At that time, the speed of the J6 axis 36 is calculated on the basis of the difference between the angle $\theta_{6(i+5)}$ of the J6 axis 36 at the next interpolated point in the path that passes through the singularity and an angle $\theta'_{6(i+4)}$ of the J6 axis 36 at the interpolated point in the path that avoids the singularity.

Subsequently, the main controller 11 calculates an allowable range of the speed of the J6 axis 36 (step S314). For example, an upper limit and a lower limit are determined by adding and subtracting a predetermined value or a predetermined ratio to and from the value of the speed of the J6 axis 36 at the interpolated point in the path that avoids the singularity. In this manner, the allowable range of the speed can be calculated. Alternatively, the allowable range of the speed of each of the axes may be determined in advance so as to be within a range that does not have an impact on the quality of the workpiece (e.g., the operating condition of the end effector 39, such as a temperature in the case of welding or a thickness condition of a coating film in the case of coating, or a condition that avoids an abnormal operation of the articulated robot, such as vibration).

Subsequently, the main controller 11 determines whether the speed of the J6 axis 36 is within the predetermined allowable range (step S315). Note that the allowable range is determined so as to be a value within a range in which when the end effector 39 is moved, an adverse effect on the operation, such as vibration, does not occur.

If the speed of the J6 axis 86 is within the predetermined allowable range (YES in step S315), the main controller 11 changes the next interpolated point from P'$_{i+5}$ to P$_{i+5}$. In addition, the main controller 11 sets the angle of the J6 axis 36 to $\theta_{6(i+5)}$ and calculates the angles of the other J1 axis 31 to the J5 axis 35 corresponding to the angle of the J6 axis 36 (step S316). The main controller 11 instructs the storage unit 12 to store the calculated angles of all of the drive shafts, that is, the angles of the J1 axis 31 to the J6 axis 36. Furthermore, the main controller 11 resets the flag indicating that the speed reduction process for the J6 axis 36 is currently being performed (step S317).

However, if the speed of the J6 axis 36 is outside the predetermined allowable range (NO in step S315), the main controller 11 sets the angle of the J6 axis 36 to an angle $\theta''_{6(i+5)}$, which is between the angle $\theta_{6(i+5)}$ and the angle $\theta'_{6(i+5)}$, and sets the interpolated point including the angle $\theta''_{6(i+5)}$ of the J6 axis 36 to the next interpolated point P''$_{i+5}$ (step S318). Thereafter, the main controller 11 calculates the angles of the other J1 axis 31 to the J5 axis 35 corresponding to the angle of the J6 axis 36 (step S319). That is, when replacing the angle $\theta'_{6(i+5)}$ of the J6 axis 36 with the angle $\theta_{6(i+5)}$, the main controller 11 gradually changes the angle of the J6 axis 36 from $\theta'_{6(i+5)}$ to $\theta_{6(i+5)}$ within a predetermined fluctuation range without abruptly changing the angle of the J6 axis 36.

In addition, the main controller 11 instructs the storage unit 12 to store the calculated angles of all of the drive shafts, that is, the angles of the J1 axis 31 to the J6 axis 36.

(Return Process of J4 Axis 34 from Speed Reduction Process)

The return process of the J4 axis 34 from the speed reduction process corresponding to step S320 is similar to the above-described return process of the J6 axis 36 from the speed reduction process (steps S311 to S319). Accordingly, descriptions of the return process is not repeated.

(Return Process of J4 Axis 34/J6 Axis 36 from Speed Reduction Process)

The return process (corresponding to step S330) of the J4 axis 34 and the J6 axis 36 from the speed reduction process is similar to the return process of the J6 axis 36 from the speed reduction process except that the return process is performed for both the J4 axis 34 and the J6 axis 36. Accordingly, descriptions of the return process is not repeated.

By, through the above-described control method, operating the position and attitude of the end effector 39 provided on the manipulator body 30 while preventing a variation of a particular component (one or two of the torch inclination angle Rx, the torch forward tilting angle Ry, and the torch rotation angle Rz) having a large weight for reduction and avoiding a singularity mainly by the main controller 11 of the articulated robot X, a work trajectory that is not significantly deviated from an interpolated point based on the taught point and that allows the speeds of all the axes to be within the allowable range without changing the moving speed of the end effector 39 can be obtained.

For example, as illustrated in FIG. 24, if a singularity at which the angles of the J4 axis 34 and the J6 axis 36 abruptly change (i.e., the speeds are outside the allowable range) appears at about 0 degrees of the J5 axis 35 rotation, the above-described speed reduction process is performed. Thus, variations of the torch inclination angle Rx and the torch forward tilting angle Ry are reduced, and the angles of the J4 axis 34 and the J6 axis 36 gently vary, as illustrated in FIG. 9. In this manner, the speeds of the J4 axis 34 and the J6 axis 36 can be set to values within the allowable range.

Figure 10:
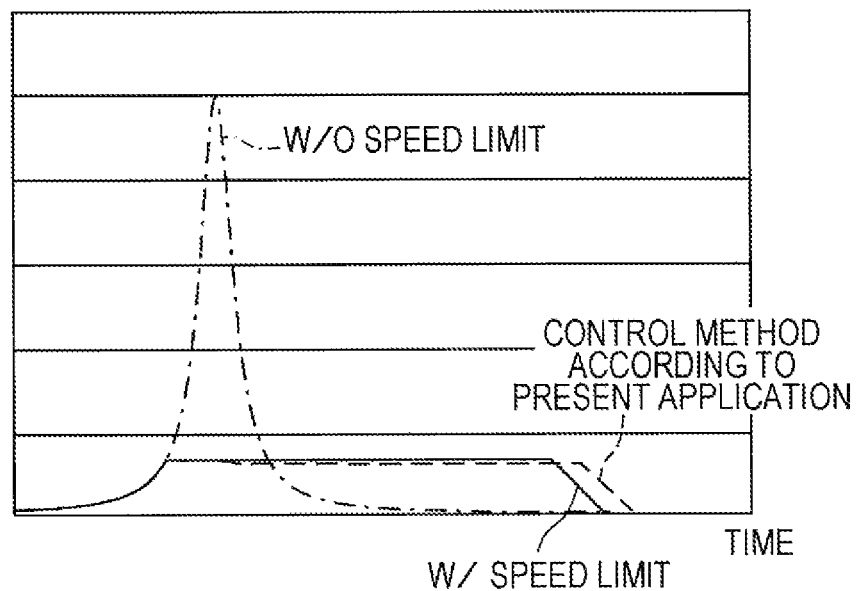
FIG. 10 illustrates an example of a variation of the speed of a J4 axis.

In addition, as illustrated in FIG. 10, if no speed limit is set (an alternate long and short dash line), the speed of the J4 axis 34 abruptly changes in the vicinity of the singularity. However, if the speed limit is simply set (a solid line) or the control method of the present invention is applied (a short dashed line), the speed can be maintained within the allowable range.

Figure 11:
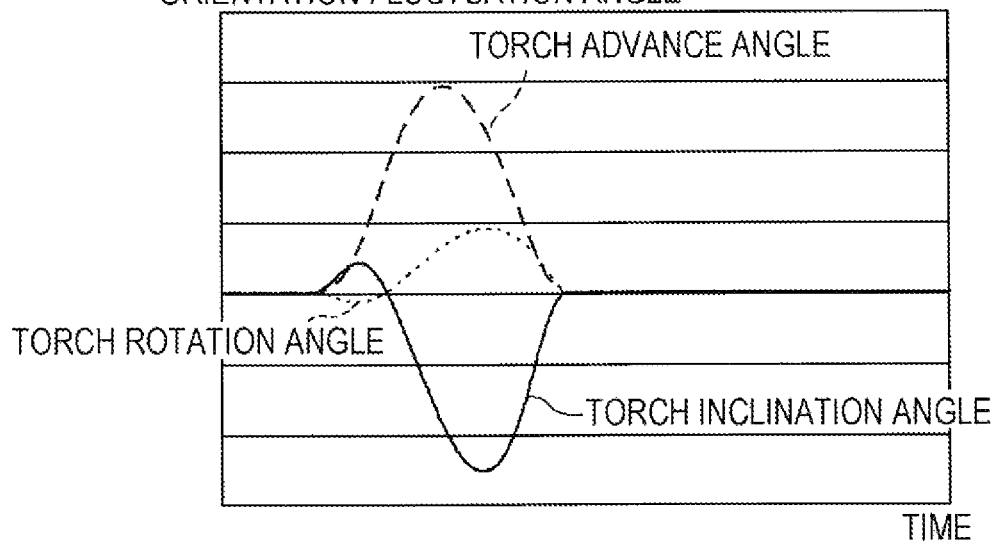
FIG. 11 illustrates an example of a variation of each of the attitude angles in a welding line coordinate system during the same-speed operation.
Figure 12:
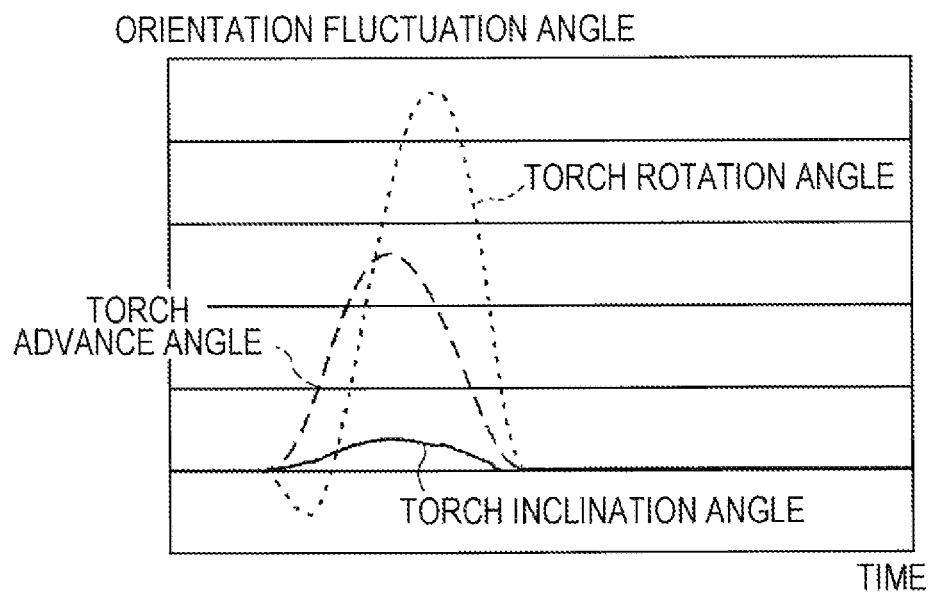
FIG. 12 illustrates an example of a variation of each of the attitude angles in a welding line coordinate system according to the control method of the present invention.

Note that if, as illustrated in FIG. 11, the speed limit is simply set, the attitude fluctuation angles of the torch forward tilting angle and the torch inclination angle significantly vary. However, as illustrated in FIG. 12, according to the control method of the present invention, although the torch rotation angle having a small weight assigned thereto (having a speed that need not be limited) significantly varies, variations of the torch inclination angle and the torch inclination angle each having a large weight assigned thereto can be eliminated.

Figure 13:
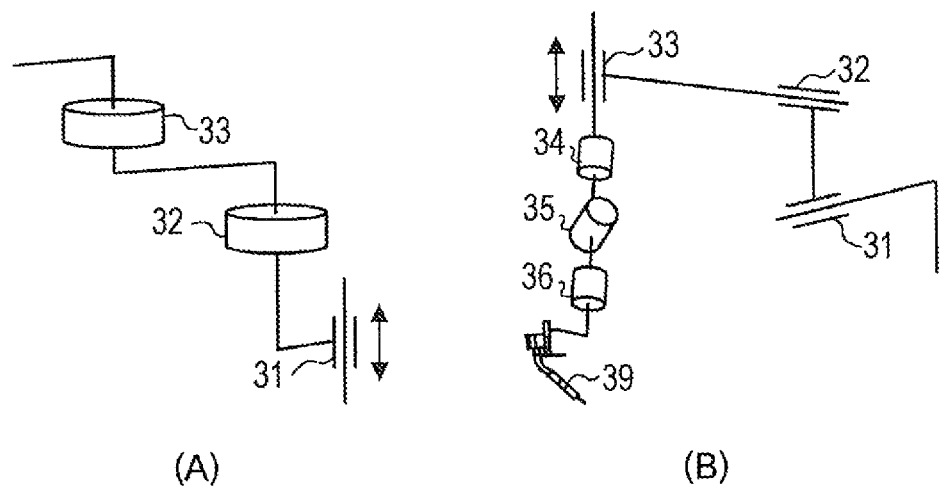
FIG. 13 illustrates another example of the second joint drive shaft.

In addition, as illustrated in FIG. 13(A), the J1 axis 31 may perform a driving operation in the up-down direction, and the driving direction of the J2 axis 32 may be the same as that of the J3 axis 33. Alternatively, as illustrated in FIG. 13(B), the J1 axis 31 and the J2 axis 32 may perform a driving operation in the right-left direction, and the J3 axis 33 may perform a driving operation in the up-down direction. Note that if a drive shaft performs a driving operation in the up-down direction, the speed may be calculated on the basis of a difference between moving distances of the drive shafts in the up-down direction in addition to the difference between the rotation angles of the motors that move the drive shafts in the up-down direction.

While the above description has been made with reference to the technique for, if the speed of an axis exceeds the allowable range, reducing the speed of the axis by increasing an amount of variation of another axis, the angle data on each of the axes may be calculated so that the acceleration is within an allowable range if the amount of variation of the speed (i.e., the acceleration) obtained in the above-described manner exceeds the allowable range. To calculate the angle data, the speed can be replaced with the acceleration, which is the amount of variation of the speed.

For example, in step S123, the main controller 11 calculates the acceleration instead of the speed. In step S131, the main controller 11 calculates the allowable range of the acceleration. In step S132, the main controller 11 determines whether the acceleration calculated in step S123 is outside the allowable range of the acceleration calculated in step S131. Thereafter, if the acceleration is outside the allowable range, the main controller 11 calculates data on the angle of each of the axes so that the acceleration is within the allowable range. At that time, the above-described predetermined values D and G used in the calculation of the candidates of the acceleration are, for example, the absolute values of a variation of acceleration that is known to have jerk within a predetermined allowable range. Note that since the calculation can be performed by simply replacing the speed with the acceleration and replacing the acceleration with the jerk (jolt) in the above-described calculation, description of the calculation is not repeated.

First Embodiment

In a first embodiment, a method for controlling an articulated robot X that differs from that in the above-described embodiment is described.

Figure 15:
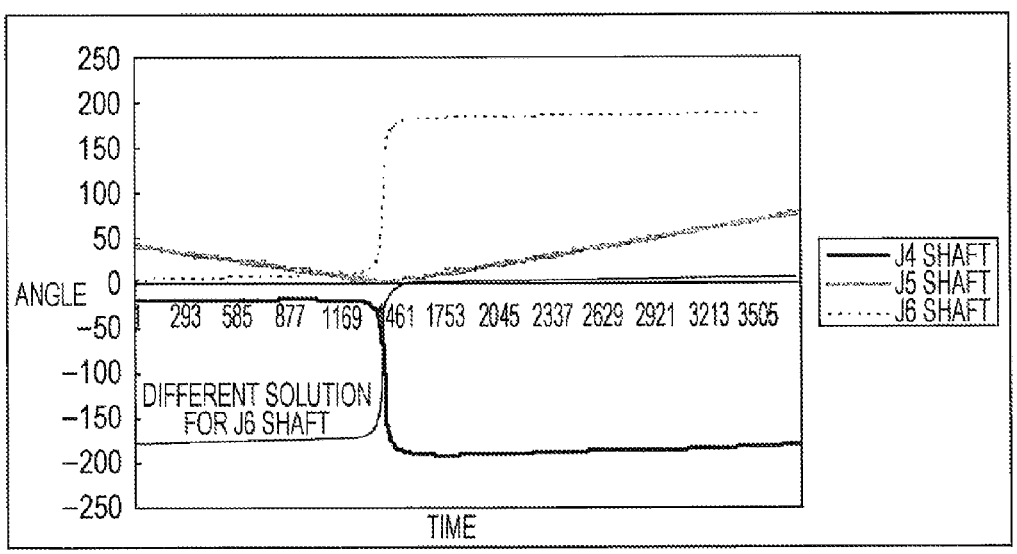
FIG. 15 is a diagram illustrating an example of a variation of the angle of the first joint drive shaft in a path that passes through a singularity.

If the articulated robot X is controlled using the method according to the above-described embodiment, control is performed so that even when the angle of the sign of the angle of the J5 axis 35 at the work start point is opposite to that at the work end point, the angle of the J5 axis 35 does not pass through 0°. Accordingly, the angle of the J5 axis 35 at the work end point is offset from an original target value. In such a case, for example, as illustrated in FIG. 15, the angles of the other J4 axis 34 and the J6 axis 36 may abruptly vary or exceed the operating limit angle (e.g., ±180°).

In addition, for the articulated robot X, two solutions of the inverse kinematics problem are obtained from one attitude data. For example, as illustrated in FIG. 15, if the amount of change in the angle of the J6 axis 36 abruptly increases or decreases, a different solution of the J6 axis 36 gets close to the current angle of the J6 axis 36. Therefore, in the first embodiment, the configuration that prevents abrupt change in the J4 axis 34 and the J6 axis 36 by using two solutions of the inverse kinematics problem is described.

Figure 14:
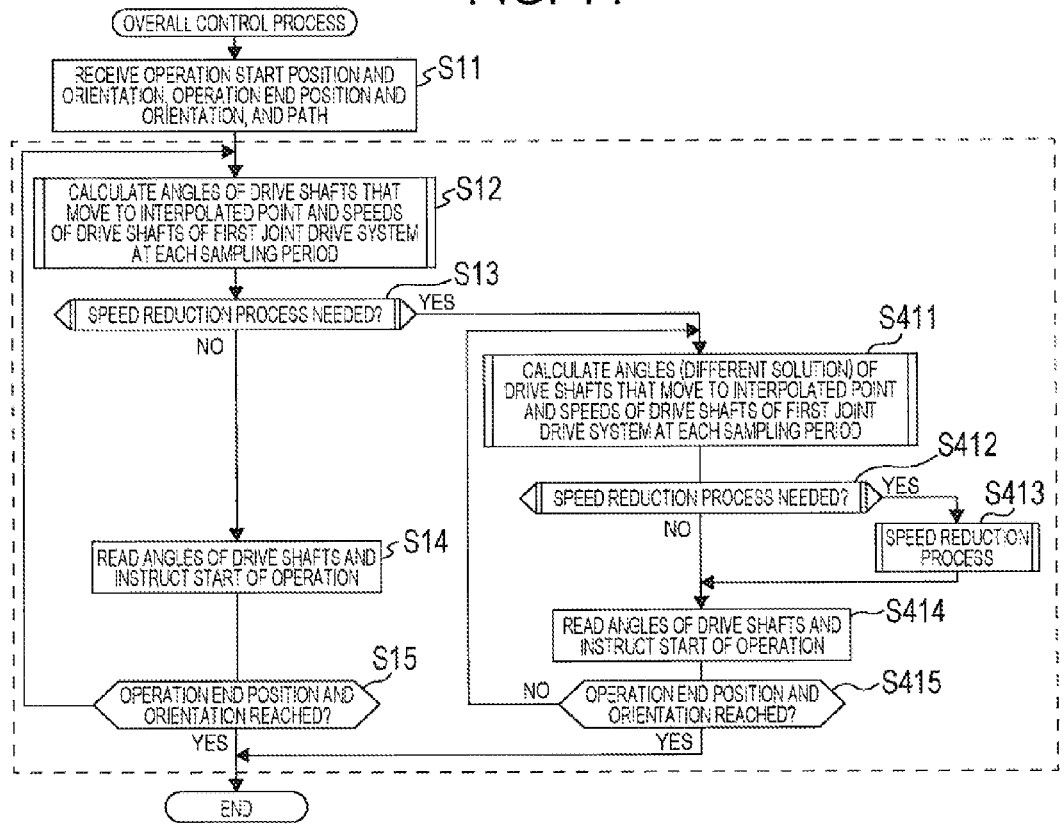
FIG. 14 is a flowchart of another example of the overall control process of the articulated robot control method.

FIG. 14 is a flowchart illustrating another method for controlling the articulated robot X. Note that the same numbering will be used in referring to a procedure as is utilized above in describing the above-described embodiment illustrated in FIG. 2 and, thus, detailed description of the procedure is not repeated.

First, like the above-described configuration, in the configuration of the first embodiment, the main controller 11 obtains, as the angles of the J1 axis 31 to the J6 axis 36 for moving the end effector 39 to the next interpolated point, a solution to the inverse kinematics problem in which the sign of the angle of the J5 axis 35 is the same as that at the work start point (S12) until it is determined in step S13 that the speed reduction process is needed (No in step S13). Note that in step S12, the speeds corresponding to the calculated J4 axis 34 to the J6 axis 36 are also calculated.

In addition, in the subsequent step S14, the main controller 11 controls the drive instructing unit 13 and reads, from the storage unit 12, the solution in the form of the angles of the J1 axis 31 to the J6 axis 36 for moving the end effector 39 to the next interpolated point so that the angle of the J5 axis 35 has a sign that is the same as the sign of the angle of the J5 axis 35 at the work start point. Thereafter, the main controller 11 outputs the angles to the actuators of the drive shafts of the manipulator body 30. In this manner, each of the J1 axis 31 to the J6 axis 36 operates by regarding, as a target value, the solution in which the angle of the J5 axis 35 has a sign that is the same as the sign of the angle of the J5 axis 35 at the work start point (Yes in S15) until the end effector 39 moves to the position and attitude at the work end point (No in S15).

(Steps S411 to S412)

However, if, in step S13, it is determined that the speed reduction process is needed (Yes in S13), the main controller 11, in the subsequent step S411, calculates the angles of the J1 axis 31 to the J6 axis 36 and the speeds of the J4 axis 34 to the J6 axis 36 at the next interpolated point as in step S12. Note that in step S411, the speeds corresponding to the calculated J4 axis 34 to the J6 axis 36 are also calculated.

However, at that time, among two solutions of the inverse kinematics problem obtained in the form of the angles of the J1 axis 31 to the J6 axis 36 for moving the end effector 39 to the next interpolated point, the main controller 11 calculates a solution to the inverse kinematics problem in which the sign of the angle of the J5 axis 35 is opposite to that at the work start point (a different solution). Let $\theta 41$, $\theta 51$, and $\theta 61$ denote the angles of the J4 axis 34, the J5 axis 35, and the J6 axis 36, respectively, serving as one of the two solutions of the inverse kinematics problem, and let $\theta 41'$, $\theta 51'$, and $\theta 61'$ denote the angles of the J4 axis 34, the J5 axis 35, and the J6 axis 36, respectively, serving as the other solution. Then, the angles have the following relationship: $\theta 41 - \theta 41' = \pm \pi$, $\theta 51 + \theta' = 0$, and $\theta 61 - \theta 61' = \pm \pi$. For example, if $(\theta 41, \theta 51, \theta 61) = (90°, 75°, 0°)$, then $(\theta 41', \theta 51', \theta 61') = (-90°, -75°, 180°)$.

As described above, according to the first embodiment, if the speeds of the J4 axis 34 and the J6 axis 36 are within the allowable range, the main controller 11 employs the solution in which the sign of the angle of the J5 axis 35 at the next interpolated point is the same as that at the work start point. However, if the speeds of the J4 axis 34 and the J6 axis 36 are outside the allowable range, the main controller 11 employs the solution in which the sign of the angle of the angle of the J5 axis 35 at the next interpolated point is opposite to that at the work start point. Note that this process is an example of the angle calculation step, and the main controller 11 that performs the process in the angle calculation step corresponds to the angle calculating means.

Thereafter, in the subsequent step S412, as in step S13, the main controller 11 determines whether the speed reduction process is necessary, that is, whether the speeds of the J4 axis 34 and the J6 axis 36 calculated in step S412 are within the allowable range or whether the speed reduction process is currently being performed for the J4 axis 34 and the J6 axis 36.

If it is determined that the speed reduction process is necessary (Yes in step S412), the processing proceeds to step S413. However, it is determined that the speed reduction process is not necessary (No in step S412), the processing proceeds to step S414.

(Step S413)

In step S413, as in step S20 illustrated in FIG. 5, the speed reduction process is performed in order to reduce the speed of one or both of the J4 axis 34 and the J6 axis 36. Note that at that time, since the main controller 11 employs one of two solutions of the inverse kinematics problem in which the sign of the J5 axis 35 is opposite to that at the work start point in the form of the angles of the J1 axis 31 to the J6 axis 36 for moving the end effector 39 to the next interpolated point, the J1 axis 31 to the J6 axis 36 operate using the solution as the target values. Also note that the process performed in step S413 is similar to the process performed in step S20 except for the angles of the J4 axis 34 and the J6 axis 36. Accordingly, description of the process performed in step S413 is not repeated.

(Steps S414 to S415)

In addition, in step S414, as in step S14, the main controller 11 controls the drive instructing unit 13 and reads, from the storage unit 12, the angles of the J1 axis 31 to the J6 axis 36 for moving the end effector 39 to the next interpolated point. Thereafter, the main controller 11 outputs the angles to the actuators of the drive shafts of the manipulator body 30. At that time, the angles of the J1 axis 31 to the J6 axis 86 are the target values calculated in step S411 or S413 as a solution in which the angle of the J5 axis 35 has a sign that is the same as the sign of the angle of the J5 axis 35 at the work start point. Accordingly, the angle of the J5 axis 35 is changed while passing through an angle of 0°.

Thereafter, each of the J1 axis 31 to the J6 axis 36 operates by regarding, as a target value, the solution in which the angle of the J5 axis 35 has a sign that is the same as the sign of the angle of the J5 axis 35 at the work start point (No in S415) until the end effector 39 moves to the position and attitude at the work end point (Yes in S415).

FIG. 15 illustrates an example of the result of the operation performed by the J4 axis, J5 axis, and J6 axis in the original path that passes through a singularity when the sign of the angle of the J5 axis 35 at the work start point is opposite to that at the work end point (when the sign changes from plus to minus or from minus to plus), that is, the angle passes through 0°. In the example illustrated in FIG. 15, control is performed so that the angle of the J5 axis 35 does not pass through 0° and, thus, the angle of the J5 axis 35 at the work end point is positive. Accordingly, it can be seen that the amounts of change in the angles of the other J4 axis 34 and J6 axis 36 are increased.

Figure 16:
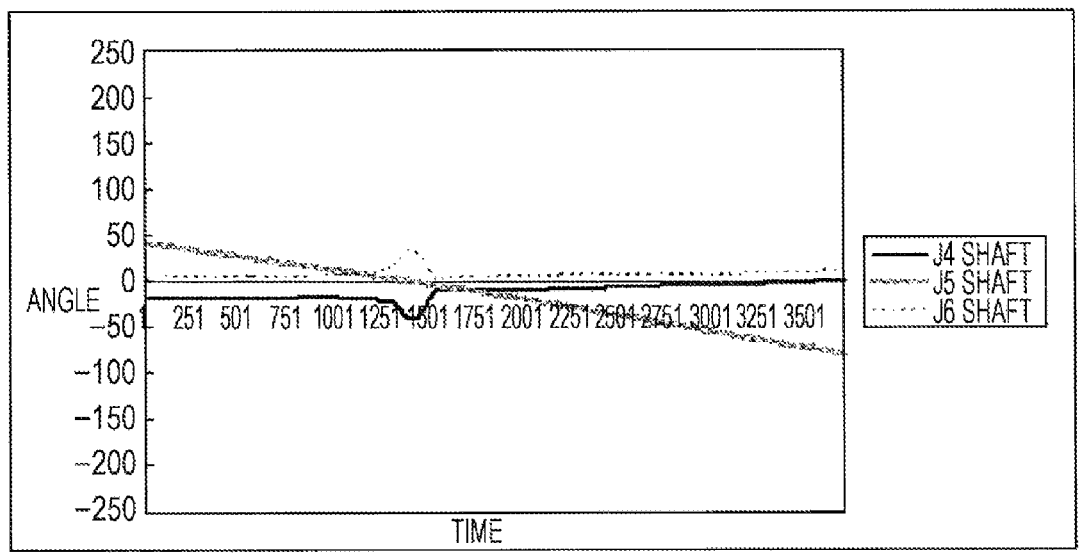
FIG. 16 is a diagram illustrating an example of a variation of the angle of the first joint drive shaft when the control method according to a first embodiment is employed.

In contrast, FIG. 16 illustrates an example of the result when the method for controlling the articulated robot X according to the first embodiment and, at that time, the sign of the angle of the J5 axis 35 at the work start point is opposite to that at the work end point. The example illustrated in FIG. 16 indicates that, by causing the J5 axis 35 to pass through 0°, the amounts of change in the angles of the other J4 axis 34 and the J6 axis 36 can be reduced.

Figure 17:
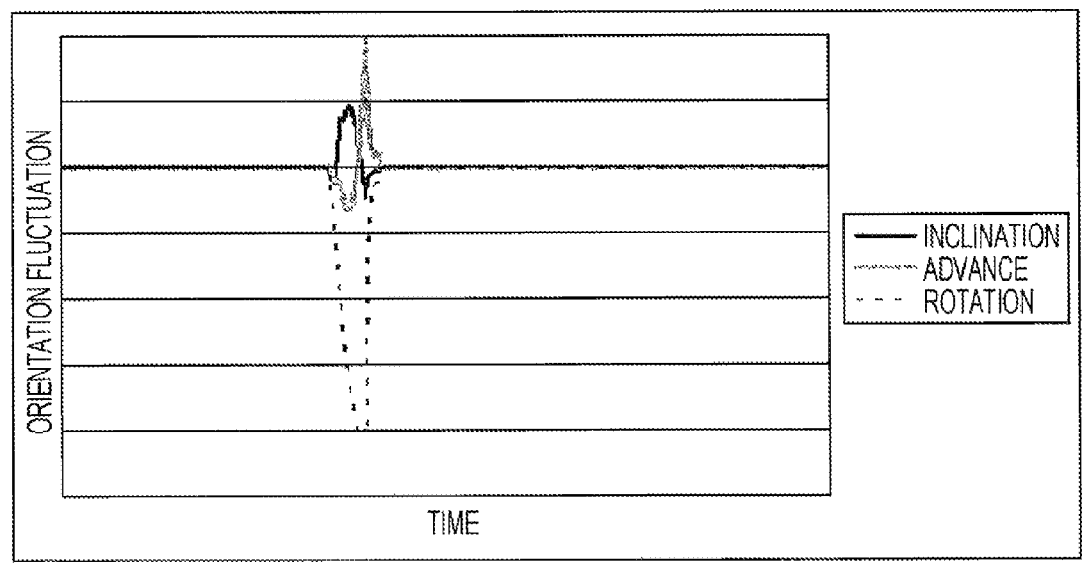
FIG. 17 illustrates an example of a variation of each of attitude angles in the welding line coordinate system during the same-speed operation.
Figure 18:
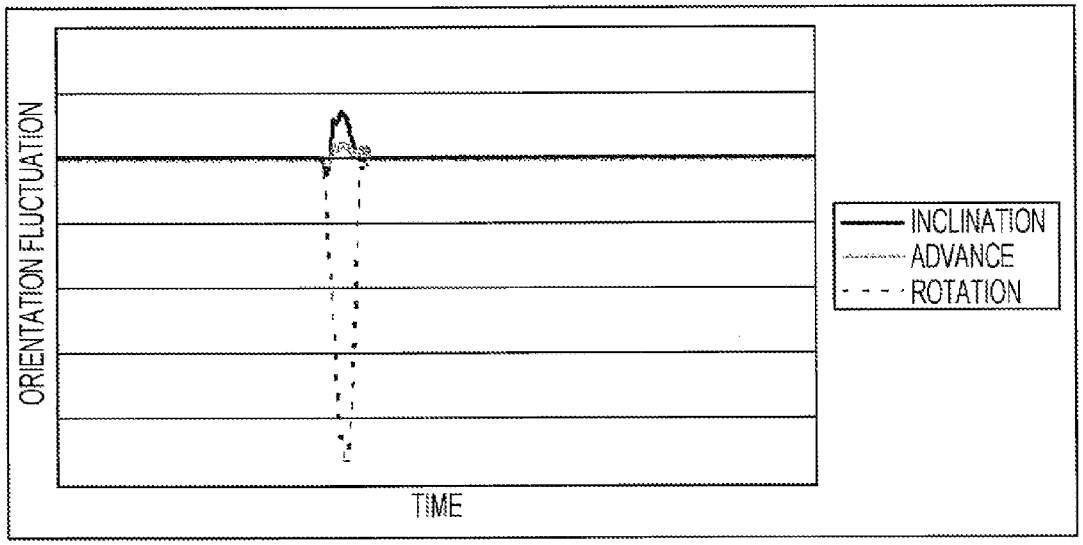
FIG. 18 illustrates an example of a variation of each of attitude angles in the welding line coordinate system when the control method according to a first embodiment is employed.

FIG. 17 illustrates a change in the attitude data of the end effector 39 occurring when the same speed operation is performed without employing the method for controlling the articulated robot X according to the first embodiment. FIG. 18 illustrates a change in the attitude data of the end effector 39 occurring when the method for controlling the articulated robot X according to the first embodiment is employed. Note that in FIGS. 17 and 18, the ordinate represents an amount of variation of the attitude data of the end effector 39 at the original interpolated point, and the abscissa represents a time.

As illustrated in FIG. 17, when the control method according to the first embodiment is not employed, variations of the inclination angle and the forward tilting angle are large. However, as illustrated in FIG. 18, when the control method according to the first embodiment is employed and if the weights of the inclination angle and the forward tilting angle (the amount of reduction in the variation) are set to large values, variations of the inclination angle and the forward tilting angle can be reduced at the expense of the accuracy of the rotation angle, which is unnecessary for welding operations.

Second Embodiment

In addition, as described in the above embodiment, when control is performed for the articulated robot X so that the angle of the J5 axis 35 does not pass through a singularity at which the angle is close to 0° between the work start point and the work end point and if the sign of the angle of the J5 axis 35 at the work start point is opposite to that at the work end point, the angle of the J5 axis 35 at the work end point differs from a desired angle.

In contrast, as noted in the above-described first embodiment, when control is performed for the articulated robot X so that the angle of the J5 axis 35 passes through an angle of about 0° between the work start point and the work end point and if the sign of the angle of the J5 axis 35 at the work start point is the same as that at the work end point, the angle of the J5 axis 35 at the work end point differs from a desired angle.

In these cases, for example, wires connected to the J1 axis 31 to the J6 axis 36 and the end effector 39 of the articulated robot X may get tangled, or the J4 axis 34 to the J6 axis 36 may exceed their drive limiting points in the subsequent operation, which is problematic.

Accordingly, the control method according to the above-described embodiment and the control method according to the first embodiment can be switched in accordance with whether the signs of the angles of the J5 axis 35 of the first articulated drive system at the work start point and the work end point are the same or different from each other.

Figure 19:
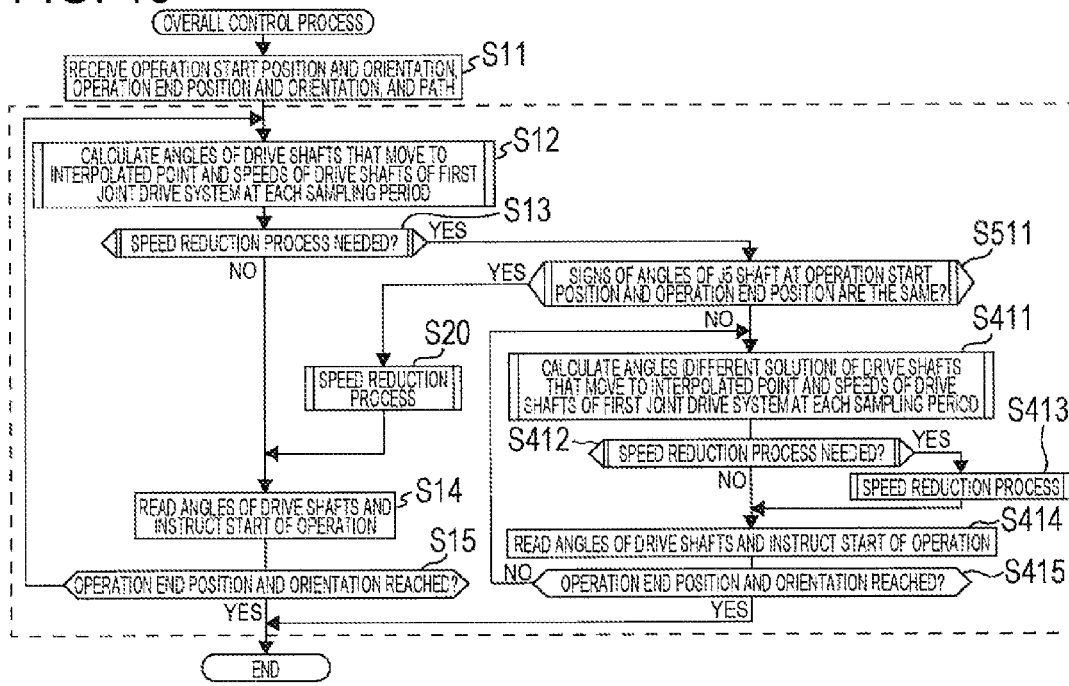
FIG. 19 is a flowchart illustrating another example of the overall control process of the articulated robot control method.

FIG. 19 is a flowchart illustrating a method for controlling the articulated robot X according to a second embodiment. Note that the same numbering will be used in referring to a procedure as is utilized above in describing the above-described embodiment and the first embodiment and, thus, detailed description of the procedure is not repeated.

More specifically, between "Yes" in step S13 and each of step S20 and step S411, the main controller 11 performs a process for determining whether the signs of the angles of the J5 axis 35 of the first articulated drive system at the work start point and the work end point are the same or different from each other (Yes in step S511).

If the signs of the angles of the J5 axis 35 of the first articulated drive system at the work start point and the work end point are the same (Yes in step S511), the processing performed by the main controller 11 proceeds to step S20. In this case, the solution to the inverse kinematics problem in which the sign of the angle of the J5 axis 35 of the first articulated drive system is the same as that at the work start point is employed.

However, the signs of the angles of the J5 axis 35 of the first articulated drive system at the work start point and the work end point are opposite to each other (No in step S511), the processing performed by the main controller 11 proceeds to step S411. In this case, the solution to the inverse kinematics problem in which the sign of the angle of the J5 axis 35 of the first articulated drive system is opposite to that at the work start point is employed. That is, in the case where the signs of the angles of the J5 axis 35 of the first articulated drive system at the work start point and the work end point are opposite to each other, when the angle of the J5 axis 35 moves close to 0° and if the speeds of the J4 axis 34 and the J6 axis 36 are within the allowable range, the solution to the inverse kinematics problem in which the sign of the angle of the J5 axis 35 of the first articulated drive system is the same as that at the work start point is employed. However, when the angle of the J5 axis 35 moves close to 0° and if the speeds of the J4 axis 34 and the J6 axis 36 are outside the allowable range, the solution to the inverse kinematics problem in which the sign of the angle of the J5 axis 35 of the first articulated drive system is opposite to that at the work start point is employed. Such a process is an example of the angle calculation step, and the main controller 11 that performs the process corresponds to the angle calculating means.

In this manner, the sign of the angle of the J5 axis 35 at the taught work end point is the same as the taught sign. Accordingly, for example, the wires connected to the J1 axis 31 to the J6 axis 36 and the end effector 39 can be prevented from getting tangled. In addition, the J4 axis 34 to the J6 axis 36 are prevented from exceeding their drive limiting points.

Third Embodiment

Figure 20:
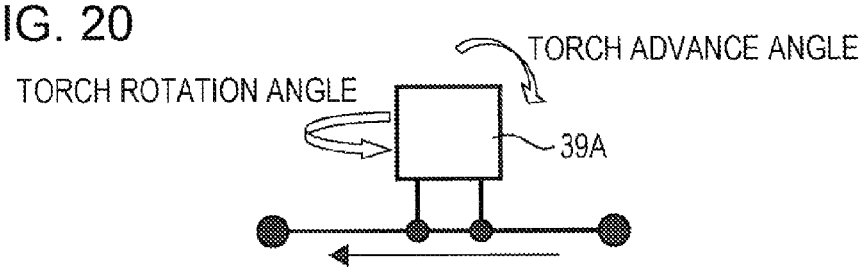
FIG. 20 illustrates an example of an end effector having two points of operation according to a third embodiment.

While the above description has been made with reference to the end effector 39 of the articulated robot X having a single work point, an articulated robot X1 including an end effector 39A having two work points may be controlled, as illustrated in FIG. 20.

The articulated robot X1 includes the end effector 39A, and the configurations other than the end effector 39A are the same as those of the articulated robot X. In addition, the control of the articulated robot X1 is the same as that of the articulated robot X except for the processes performed in steps S215 and S216 illustrated in FIG. 5 (including steps S225, S226, S235 and S236). Hereinafter, descriptions of the processes and configurations of the articulated robot X1 that are the same as those of the articulated robot X are not repeated.

The configurations of the articulated robot X1 that differ from those of the articulated robot X illustrated in FIG. 1 are described first.

The end effector 39A is attached to the top end of the manipulator body 30 (the top end of the J6 axis 86). The end effector 39A is an effector having two work points that have an effect on a workpiece. Examples of the work point include a welding device (a torch), a painting device, a tool, a gripper, and a sensor. Note that a torch having two work points is referred to as a "tandem torch".

Subsequently, the processes performed in steps S215 and S216 of the speed reduction process that differ from those of the embodiments of the present invention are mainly described next with reference to the flowchart illustrated in FIG. 5.

First, the main controller 11 performs step S201. In this case, the speed of the J6 axis 36 is outside the allowable range, or a flag indicating that the speed reduction process for the J6 axis 36 is currently being performed is set ("J6 axis outside range" in step S201). The main controller 11 further performs steps S211 to S214.

Subsequently, in step S215, the main controller 11 acquires information (weight information) regarding a component for which the variation thereof needs to be reduced from among the components (torch inclination angle Rx, torch forward tilting angle Ry, torch rotation angle Rz) of data defining the attitude of the end effector 39A in the weld line coordinate system Σline converted in step S213. At that time, according to the third embodiment, the end effector 39A is the welding torch having two work points. Because of the nature of a welding task using a welding torch, the rotation angle about the axis of the torch and the advance rate of the torch are important. Thus, according to the first embodiment, the standard setting is determined in advance so that the torch rotation angle Rz is a component having a large weight (i.e., components having a value to be reduced), and the torch forward tilting angle Ry is a component having a small weight (i.e., a component having a value that is not reduced).

Subsequently, in step S216, the main controller 11 selects, from among a plurality of calculated candidates for the next interpolated point, a candidate having the smallest variation of a particular component (one or two of the torch inclination angle Rx, the torch forward tilting angle Ry, and the torch rotation angle Rz) having a large weight for reduction obtained in step S215. For example, when variation of the torch rotation angle Rz is reduced and if variation of the torch forward tilting angle Ry is allowed, the weighting coefficients are set so that A=0.2, B=0, and C=1 (i.e., the particular components are the torch inclination angle and the torch rotation angle) or A=0, B=0, and C=1 (i.e., the particular component is the torch rotation angle). Thereafter, the following operations (1") to (3") are performed for the candidates in the above-described operations (1') to (3') performed in step S213, respectively:

(1") $[F_a = A(Rx-R_{xa})^2 + B(Ry-R_{ya})^2 + C(Rz-R_{za})^2]$,
(2") $[F_b = A(Rx-R_{xb})^2 + B(Ry-R_{yb})^2 + C(Rz-R_{zb})^2]$, and
(3") $[F_c = A(Rx-R_{xc})^2 + B(Ry-R_{yc})^2 + C(Rz-R_{zc})^2]$.

Through the above-described operations (1") to (3"), a difference between the attitude angle of the end effector 39A at the next interpolated point in the path that passes through the singularity and the attitude angle of the end effector 39A at the next interpolated point in the path that avoids the singularity can be obtained for each of the candidates. Thereafter among Fa to Fc, the smallest value (the smallest variation) is selected, and the angles of the J1 axis 31 to the J6 axis 36 of the selected candidate are employed as the angles of the axes in the operation for avoiding the singularity.

Subsequently, the main controller 11 performs step S217 and the subsequent steps. Note that as in the embodiment, instead of performing steps S211 to S216, the main controller 11 performs steps S221 to S226 or steps S231 to S236 for each of the drive shafts that are determined to have a speed outside the allowable range.

Through the above-described control method, by activating the position and attitude of the end effector 39A provided in the manipulator body 30 while reducing variation of the torch inclination angle Rx and the torch rotation angle Rz each having a large weight for reduction and avoiding the singularity mainly by the main controller 11 of the articulated robot X1, a work trajectory that is not significantly deviated from the interpolated points based on the taught points and that allows the speeds of all the axes to be within the allowable range without changing the moving speed of the end effector 39A can be obtained.

Figure 21:
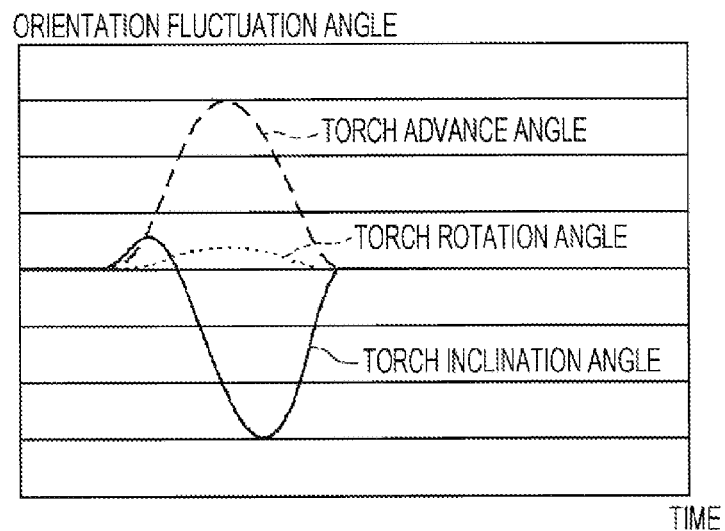
FIG. 21 illustrates an example of a variation of each of the attitude angles of two points of operation of the end effector of the articulated robot in the welding line coordinate system in a path that avoids the singularity.

In addition, if, as illustrated in FIG. 21, the control method according to the first embodiment is applied, the torch forward tilting angle Ry having a small weight for reduction significantly varies. However, the attitude fluctuation angle of the torch rotation angle Rz having a large weight for reduction can be reduced.

Fourth Embodiment

While the above description has been made with reference to the control method of the manipulator body 30 including three axes, that is, the J1 axis 31 to the J3 axis 33 as drive shafts of the second articulated drive system of the articulated robot X, the control method can be applied to a manipulator including four or more drive shafts of the second articulated drive system. Note that hereinafter, descriptions of the configurations and processes of an articulated robot X2 that are the same as those of the articulated robot X are not repeated.

Figure 22:
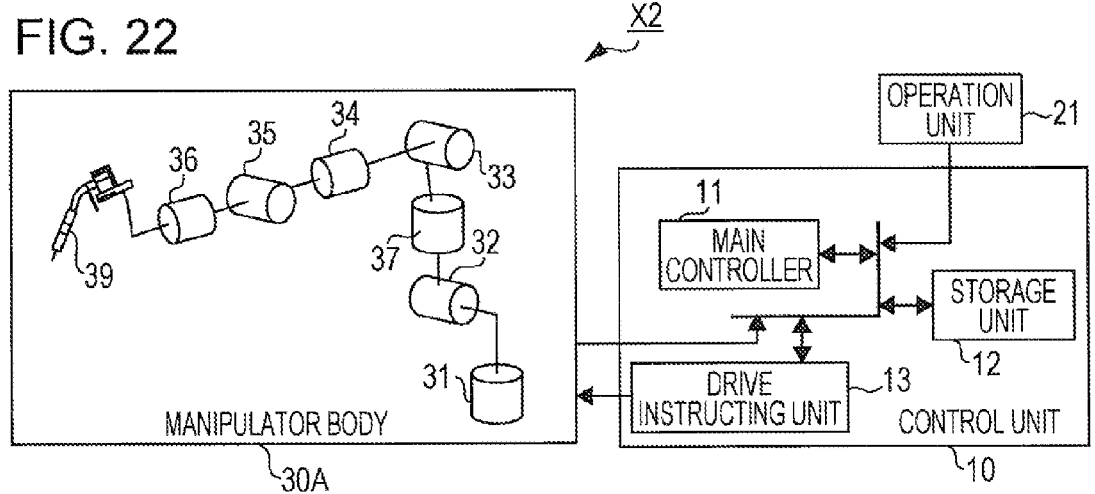
FIG. 22 is a block diagram of the schematic configuration of an articulated robot X2 controlled using an example of an articulated robot control method according to a fourth embodiment.
Figure 23:
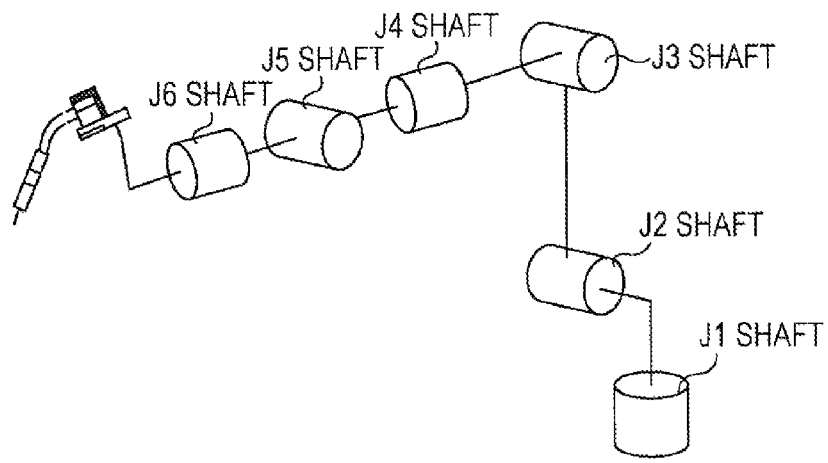
FIG. 23 illustrates a schematic configuration of a widely used 6-axis manipulator.

The configurations of the articulated robot X2 illustrated in FIG. 22 that differ from those of the articulated robot X illustrated in FIG. 1 are described first.

As illustrated in FIG. 22, the articulated robot X1 includes the control unit 10, the operation unit 21, and a manipulator body 30A. The manipulator body 30A includes three drive shafts of the first articulated drive system, that is, the J4 axis 34, the J5 axis 35, and the J6 axis 36, and four drive shafts of the second articulated drive system, that is, the J1 axis 31, the J2 axis 32, the J3 axis 33, and a J7 axis 37.

Like the J1 axis 31 to the J6 axis 36, the J7 axis 37 is driven by, for example, an electric motor. In response to an instruction received from the drive instructing unit 13, the J7 axis 37 is driven to rotate in the positive and negative directions. Through rotational drive of a plurality of axes in conjunction with one another, the motion of a wrist and an arm of a human can be realized. Among the plurality of axes, the four axes of the second articulated drive system including the J7 axis 37 simulate the motion of a human arm and move the position of the end effector 39.

The processes that differ from those according to the embodiment of the present invention are described next with reference to the flowcharts illustrated in FIGS. 2 to 6.

According to the embodiment, angles $(\theta_1, \theta_2, \theta_3, \theta_4, \theta_5, \theta_6)$ of the J1 axis 31 to the J6 axis 36 are calculated from the position and attitude $P_i(X_i, Y_i, Z_i, \alpha_i, \beta_i, \gamma_i)$ of an interpolated point as the solution to an inverse kinematics problem, and the position and attitude $P_i(X_i, Y_i, Z_i, \alpha_i, \beta_i, \gamma_i)$ are calculated from angles $(\theta_1, \theta_2, \theta_3, \theta_4, \theta_5, \theta_6)$ of the J1 axis 31 to the J6 axis 36 as the solution to a forward kinematics problem. In contrast, according to the fourth embodiment, angles $(\theta_1, \theta_2, \theta_3, \theta_4, \theta_5, \theta_6, \theta_7)$ of the J1 axis 31 to the J7 axis 37 are calculated from the position and attitude $P_i(X_i, Y_i, Z_i, \alpha_i, \beta_i, \gamma_i)$ of an interpolated point as the solution to an inverse kinematics problem, and the position and attitude $P_i(X_i, Y_i, Z_i, \alpha_i, \beta_i, \gamma_i)$ are calculated from angles $(\theta_1, \theta_2, \theta_3, \theta_4, \theta_5, \theta_6, \theta_7)$ of the J1 axis 31 to the J7 axis 37 as the solution to a forward kinematics problem. As described above, the numbers of variables of angle differ from each other (i.e., 6 and 7).

In step S122, by calculating the solution to the inverse kinematics problem, the main controller 11 obtains the angles $(\theta_1, \theta_2, \theta_3, \theta_4, \theta_5, \theta_6, \theta_7)$ of the J1 axis 31 to the J7 axis 37 from the position and attitude $P_{i+1}(X_{i+1}, Y_{i+1}, Z_{i+1}, \alpha_{i+1}, \beta_{i+1}, \gamma_{i+1})$ at the next interpolated point and stores the obtained angles in the storage unit 12.

Subsequently, the processes that are the same as those in step S123 and the subsequent steps are performed. At that time, it is determined that the speed reduction process is necessary (YES in S13), and the speed of the J6 axis 36 is outside the allowable range or a flag indicating that the speed reduction process of the J6 axis 36 is being performed is set ("J6 axis outside range" in step S201) is set. In addition, in step S211, the candidates of the angle of the J6 axis 36 are calculated.

Subsequently, in step S212, the main controller 11 calculates the angles of the other J1 axis 31 to J5 axis 35 and J7 axis 87 corresponding to each of the calculated candidates of the angle of the J6 axis 36 at the next interpolated point. For example, as illustrated in the following operations (1) to (3), by using the position $(X_{i+1}, Y_{i+1}, Z_{i+1})$ of the end effector 39 at the next interpolated point $P_{i+1}$ calculated in step S122 and the angles $(\theta_4, \theta_5)$ of the J4 axis 34 and the J5 axis 35 of the first articulated drive system, the main controller 11 recalculates the angles $(\theta_1, \theta_2, \theta_3, \theta_7)$ of the J1 axis 31 to the J3 axis 33 and the J7 axis 37 of the second articulated drive system for each of the candidates $(\theta_{6a}, \theta_{6b}, \theta_{6c})$ of the angle of the J6 axis 36.

(1) Calculating $[\theta_{1a}, \theta_{2a}, \theta_{3a}, \theta_4, \theta_5, \theta_{6a}, \theta_7]$ from $[X_{i+1}, Y_{i+1}, Z_{i+1}, \theta_4, \theta_5, \theta_{6a}]$ for the candidate $\theta_{6a}$.
(2) Calculating $[\theta_{1b}, \theta_{2b}, \theta_{3b}, \theta_4, \theta_5, \theta_{6b}, \theta_7]$ from $[X_{i+1}, Y_{i+1}, Z_{i+1}, \theta_4, \theta_5, \theta_{6b}]$ for the candidate $\theta_{6b}$.
(3) Calculating $[\theta_{1c}, \theta_{2c}, \theta_{3c}, \theta_4, \theta_5, \theta_{6c}, \theta_7]$ from $[X_{i+1}, Y_{i+1}, Z_{i+1}, \theta_4, \theta_5, \theta_{6c}]$ for the candidate $\theta_{6c}$.

Subsequently, in step S213, the main controller 11 calculates the components of data (torch inclination angle Rx, torch forward tilting angle Ry, torch rotation angle Rz) defining the attitude of the end effector 39 in the weld line coordinate system at the next interpolated point in the calculated system that avoids a singularity. For example, the main controller 11 performs the following operations for the candidates $\theta_{6a}$ to $\theta_{6c}$ in the above-described operations (1) to (3):
(1') Calculating $[R_{xa}, R_{ya}, R_{za}]$ from $[\theta_{1a}, \theta_{2a}, \theta_{3a}, \theta_{4a}, \theta_5, \theta_{6a}, \theta_7]$,
(2') Calculating $[R_{xb}, R_{yb}, R_{zb}]$ from $[\theta_{1b}, \theta_{2b}, \theta_{3b}, \theta_{4b}, \theta_5, \theta_{6b}, \theta_7]$, and
(3') Calculating $[R_{xc}, R_{yc}, R_{zc}]$ from $[\theta_{1c}, \theta_{2c}, \theta_{3c}, \theta_{4c}, \theta_5, \theta_{6c}, \theta_7]$.

Subsequently, in step S214, the main controller 11 calculates the components of data (torch inclination angle Rx, torch forward tilting angle Ry, torch rotation angle Rz) defining the attitude of the end effector 39 in the weld line coordinate system at the next interpolated point $P_{i+1}$ in the calculated system that passes through the singularity.

Subsequently, the main controller 11 performs the processes in step S215 and the subsequent steps. Note that as in the embodiment, instead of performing steps S211 to S216, the main controller 11 performs steps S221 to S226 or steps S231 to S236 for each of the drive shafts that are determined to have a speed outside the allowable range.

Through the above-described control method, by activating the position and attitude of the end effector 39 provided in the manipulator body 30A with four axes of the second articulated drive system while reducing variation of the component (any one of the torch inclination angle Rx, the torch forward tilting angle Ry, and the torch rotation angle Rz) having a large weight for reduction and avoiding the singularity mainly by the main controller 11 of the articulated robot X2, a work trajectory that is not significantly deviated from the interpolated points based on the taught points and that allows the speeds of all the axes to be within the allowable range without changing the moving speed of the end effector 39 can be obtained.

As described above, the control method according to the fourth embodiment is useful for controlling a manipulator having a plurality of joint shafts for which the angles $(\theta_4, \theta_5, \theta_6)$ of the shafts of the first articulated drive system can be obtained from the position and attitude $(X_i, Y_i, Z_i, \alpha_i, \beta_i, \gamma_i)$ at the interpolated point $P_i$ as the solution to the inverse kinematics problem and, in addition, the angles $(\theta_1, \theta_2, \theta_3, \theta_7)$ of the shafts of the second articulated drive system can be obtained from the position and angles $(X_i, Y_i, Z_i, \theta_4, \theta_5, \theta_6)$ of the shafts of the first articulated drive system at the interpolated point $P_i$ as the solution to the inverse kinematics problem.

Accordingly, the control method can be applied to not only articulated robots having the above-described 6-axis or 7-axis manipulator but articulated robots having 8 or more-axis manipulators.

Fifth Embodiment

Figure 29:
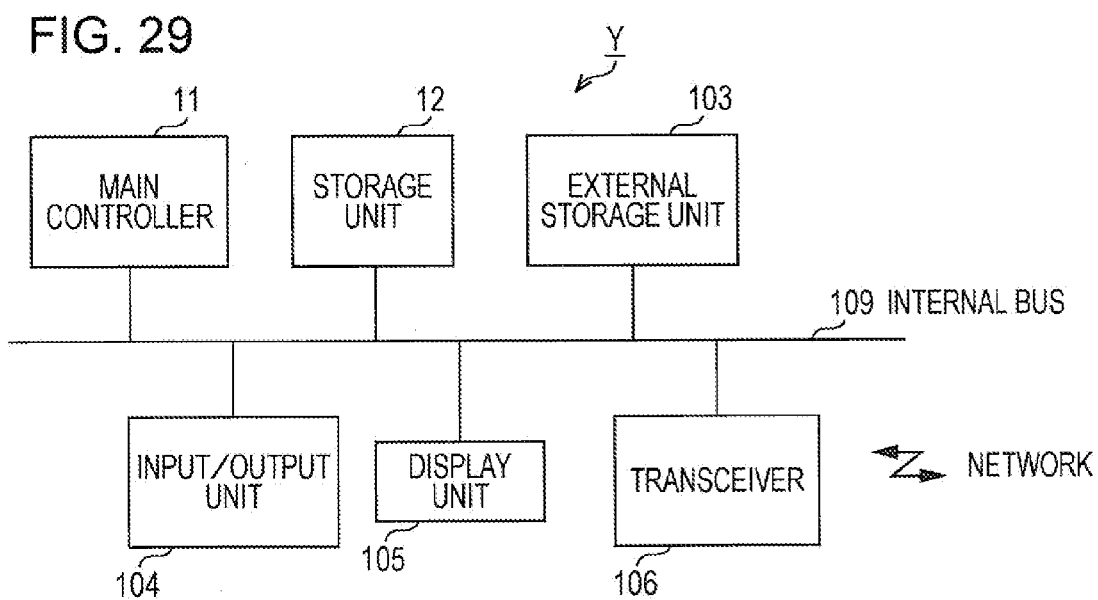
FIG. 29 is a block diagram of a schematic configuration of a computer system Y according to a fifth embodiment.

In addition, the control unit 10 of the articulated robot X can be realized without using a dedicated system, that is, by using a widely used computer system Y connected to a network illustrated in FIG. 29. The widely used computer system Y illustrated in FIG. 29 includes, for example, the main controller 11, the storage unit 12, an external storage unit 103, an input/output unit 104, a display unit 105, a transceiver 106, and an internal bus 109. The main controller 11 includes a CPU (Central Processing Unit), and the storage unit 12 includes, for example, a RAM (Random Access Memory). The main controller 11 executes a program stored in the storage unit 12 to realize the control unit 10, which is the control apparatus of the articulated robot X.

For example, by storing a program that executes the above-described process in a computer-readable recording medium (e.g., a flexible disk, a CD-ROM, or a DVD-ROM), distributing the recording medium, and installing the program in a computer, the control unit 10 of the articulated robot X that executes the above-described process may be configured. Alternatively, the program may be stored in a storage unit of a server apparatus in a communication network, such as the Internet. Thereafter, a widely used computer, for example, may download the program. In this manner, the control unit 10 of the articulated robot X may be configured.

Although the invention has been described by reference to specific embodiments, it should be understood that numerous modifications and combinations needed due to the design and other factors may be made within the spirit and scope of the inventive concepts described.

In the above-described embodiments, for example, a singularity avoidance process for avoiding the singularity of the J5 axis 35 is performed so that one of or both of the speeds of the J4 axis 34 and the J6 axis 36 of the first articulated drive system are not outside the allowable range. At that time, the articulated robot may include means for externally announcing that the singularity avoidance process is being performed.

Figure 30:
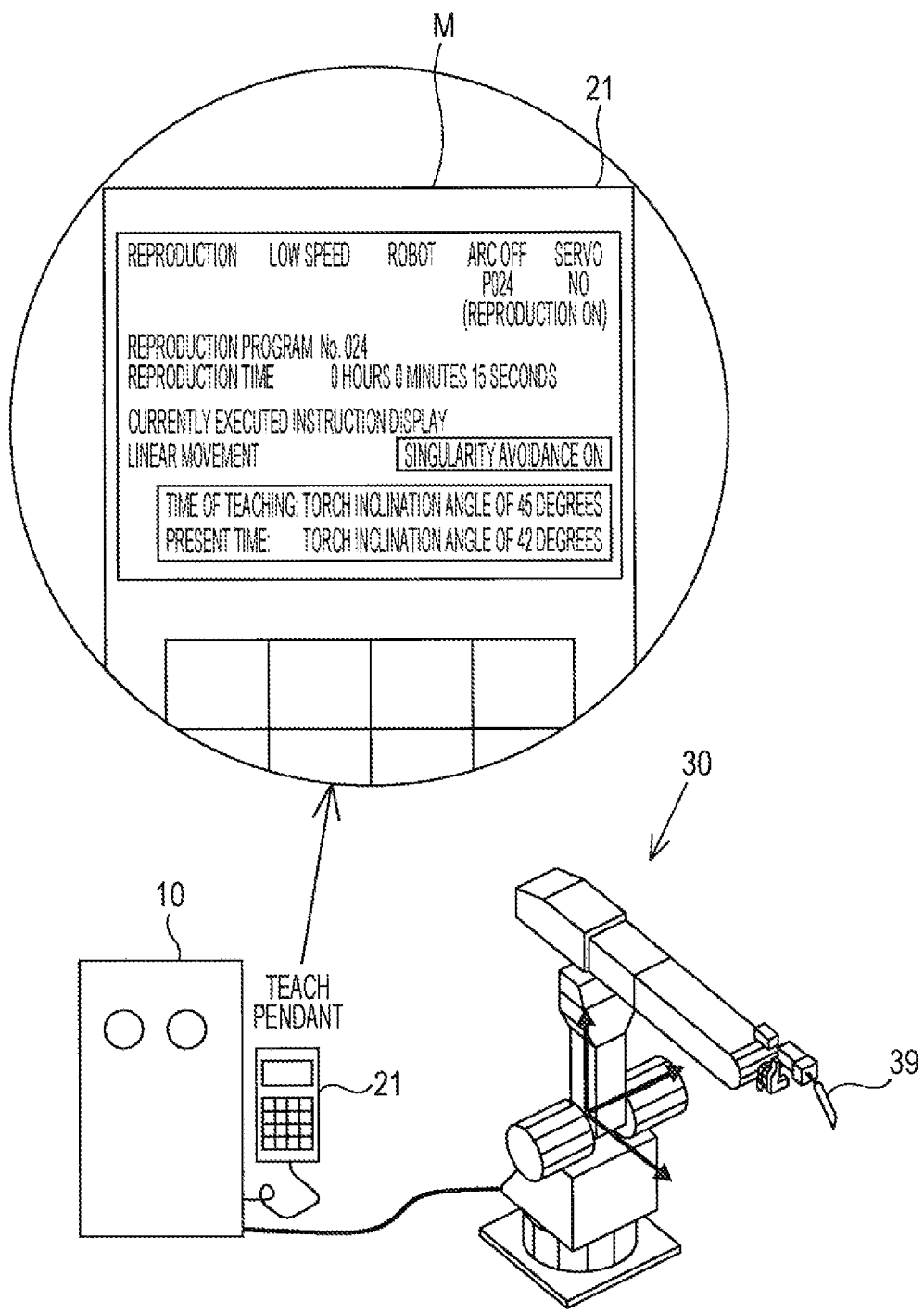
FIG. 30 is a diagram illustrating an apparatus for announcing that a singularity is being avoided.

More specifically, when, as illustrated in FIG. 5, the speed reduction process is performed in order to avoid the singularity, the message "Singularity Avoidance ON" indicating that a singularity avoidance process is being performed may be displayed on a display screen M of the operation unit 21 (a teach pendant), as illustrated in FIG. 30. However, the displayed information is not limited to the message "Singularity is being avoided". Any type of information that indicates that a singularity avoidance process is being performed can be used.

By displaying information indicating that a singularity avoidance process is being performed, an operator can recognize whether the manipulator body 30 is in a singularity avoidance mode (an avoidance welding mode) or in a non-singularity avoidance mode (a normal welding mode) during a welding operation. Accordingly, if, for example, quality inspection is performed after a workpiece (a material) is welded, the operator can carefully watch a portion welded in the avoidance welding mode and inspect the weld quality. Thereafter, the operator can change the weld condition for welding in the avoidance welding mode on the basis of the result of inspection as needed. In addition, for example, the operator can monitor the motion of the whole manipulator body 30 in the avoidance welding mode by eye. Thereafter, the operator can change the operation performed by the manipulator body 30 when the manipulator body 30 is activated for, for example, the next welding operation.

Note that in addition to displaying the message "Singularity Avoidance ON", identification of the processing program (e.g., the program number of a reproducing program) may be displayed on the display screen M. Alternatively, a period of time during which the processing program is being executed (a reproduction time) or the type of motion of the end effector 39 (e.g., "linear movement") may be displayed on the display screen M. Furthermore, the previously taught torch information (e.g., the torch inclination angle, the torch forward tilting angle, and the torch rotation angle) and the current torch information may be displayed on the display screen M.

In this manner, the operator can recognize the detailed status of the manipulator body 30 in the singularity avoidance mode.

While the above-described example has been described with reference to the display screen M displaying information indicating that a singularity avoidance process is being performed, the information indicating that a singularity avoidance process is being performed may be provided using sound from, for example, a speaker. Alternatively, the information may be provided using a lighted lamp or a blinking lamp. Still alternatively, the information indicating that a singularity avoidance process is being performed may be displayed on an external display unit other than the teach pendant 21 of the articulated robot.

In addition, a time of "Singularity Avoidance ON" may be stored in the storage unit 12 of the control unit 10. Thereafter, the time log of the singularity avoidance mode may be displayed on the display screen M of the operation unit 21 (the teach pendant) after the welding operation is completed so that the operator can recognize the time log of the singularity avoidance mode.

REFERENCE SIGNS LIST

X, X1, X2 articulated robot
10 control unit
11 main controller
12 storage unit
13 drive instructing unit
21 operation unit
30, 30A manipulator body
31 J1 axis
32 J2 axis
33 J3 axis
34 J4 axis
35 J5 axis
36 J6 axis
37 J7 axis
39, 39A end effector

The invention claimed is:

1. A control unit of an articulated robot for controlling the articulated robot, the articulated robot including a first articulated drive system having a working part that moves along a working line of a workpiece on a top end thereof and three drive shafts that are connected to the working part and that change the attitude of the working part and a second articulated drive system having at least three drive shafts that are connected to the first articulated drive system and that change the position of the first articulated drive system, the unit comprising:

interpolation data calculating means for calculating data describing the position and attitude of the working part at each of a plurality of interpolated points that lie on a previous teaching path connecting the work start point and attitude to the work end point and attitude of the working part in a base coordinate system of the articulated robot;

angle calculating means for calculating the angles of all of the drive shafts in the first articulated drive system and the second articulated drive system, the angles representing the position and the attitude of the working part at each of the interpolated points by finding a solution to an inverse kinematics problem from the data calculated by the interpolation data calculating means;

speed calculating means for calculating the speeds of two drive shafts located at both ends of the first articulated drive system when the attitude of the working part is moved to the next interpolated point on the basis of a difference between the angle of each of the drive shafts of the first articulated drive system at a current interpolated point and the angle at the next interpolated point calculated by the angle calculating means;

attitude data converting means for converting the data calculated by the interpolation data calculating means into attitude data describing the attitude of the working part in a work coordinate system having an axis extending in a moving direction of the working part, an axis extending in a direction that is perpendicular to the axis in the moving direction, and an axis perpendicular to each of the two axes;

recalculating means for, if the speed of at least one of the two drive shafts located at both the ends of the first articulated drive system and calculated by the speed calculating means is outside a predetermined allowable range, recalculating the angles of the drive shafts of the first articulated drive system so that the speeds of the two drive shafts located at both the ends of the first articulated drive system are within the allowable range without changing the moving speed of the working part and with reducing variation of one or two of particular components of the attitude data of the working part at the next interpolated point converted by the attitude data converting means and recalculating the angles of the drive shafts of the second articulated drive system on the basis of the calculated angles of the drive shafts of the first articulated drive system and the position of the working part calculated by the interpolation data calculating means; the recalculating means includes:

angle candidate calculating means for calculating, on the basis of the angle of each of the drive shafts of the first articulated drive system at the current interpolated point, a plurality of candidates of the angle of each of the drive shafts so that the angle of each of the drive shafts follows the angle at the next interpolated point calculated by the angle calculating means and, in addition, the speeds of two drive shafts located at both ends of the first articulated drive system at the next interpolated point are within the allowable range, attitude data calculating means for calculating attitude data that defines the attitude of the working part at the next interpolated point in the work coordinate system when each of the candidates of the angle calculated by the angle candidate calculating means is employed, and angle selecting means for selecting, from among the plurality of attitude data calculated by the attitude data calculating means, attitude data having the smallest variation of the particular component for the attitude data of the working part at the next interpolated point converted by the attitude data converting means and selecting the angle corresponding to the attitude data as the angle of the drive shaft;

and drive instructing means for, if the speeds of the two drive shafts located at both ends of the first articulated drive system calculated by the speed calculating means are within the allowable range, driving the articulated robot on the basis of the angles of the drive shafts calculated by the angle calculating means and, if the speed of at least one of the two drive shafts located at both ends of the first articulated drive system calculated by the speed calculating means is outside the allowable range, driving the articulated robot on the basis of the angles of the drive shafts calculated by the recalculating means.

2. The control unit of an articulated robot according to claim 1, wherein when the angle of the drive shaft of the first articulated drive system is defined as ±180°, the angle calculating means calculates a solution to an inverse kinematics problem in which the sign of the angle of the drive shaft located in the middle of the first articulated drive system at the next interpolated point is the same as the sign of the angle of the drive shaft at the work start point.

3. The control unit of an articulated robot according to claim 1, wherein when the angle of the drive shaft of the first articulated drive system is defined as ±180° and if the speeds of the two drive shafts located at both ends of the first articulated drive system calculated by the speed calculating means are within the allowable range, the angle calculating means calculates a solution to an inverse kinematics problem in which the sign of the angle of the drive shaft located in the middle of the first articulated drive system at the next interpolated point is the same as the sign of the angle of the drive shaft at the work start point, and wherein if the speed of at least one of the two drive shafts located at both ends of the first articulated drive system calculated by the speed calculating means is outside the allowable range, the angle calculating means calculates a solution to an inverse kinematics problem in which the sign of the angle of the drive shaft located in the middle of the first articulated drive system at the next interpolated point is opposite to the sign of the angle of the drive shaft at the work start point.

4. The control unit of an articulated robot according to claim 1, wherein when the angle of the drive shaft of the first articulated drive system is defined as ±180° and if the signs of the angles of the drive shaft located in the middle of the first articulated drive system at the work start point and at the work end point are the same, the angle calculating means calculates a solution to an inverse kinematics problem in which the sign of the angle of the drive shaft located in the middle of the first articulated drive system at the next interpolated point is the same as the sign of the angle of the drive shaft at the work start point, and wherein when the signs of the angles of the drive shaft located in the middle of the first articulated drive system at the work start point and the work end point are opposite to each other and if the speeds of the two drive shafts located at both ends of the first articulated drive system calculated by the speed calculating means are within the allowable range, the angle calculating means calculates a solution to an inverse kinematics problem in which the sign of the angle of the drive shaft located in the middle of the first articulated drive system at the next interpolated point is the same as the sign of the angle of the drive shaft at the work start point, and wherein if the speed of at least one of the two drive shafts located at both ends of the first articulated drive system calculated by the speed calculating means is outside the allowable range, the angle calculating means calculates a solution to an inverse kinematics problem in which the sign of the angle of the drive shaft located in the middle of the first articulated drive system at the next interpolated point is opposite to the sign of the angle of the drive shaft at the work start point.

5. The control unit of an articulated robot according to claim 1, wherein the recalculating means recalculates the angle of the drive shaft so that among the particular components of the attitude data of the working part converted by the attitude data converting means, as a particular component has a higher predetermined weight, an amount of reduction in variation of the particular component is higher.

6. The control unit of an articulated robot according to claim 1, wherein the working part is a torch,
   wherein the attitude data is expressed in the work coordinate system having an X-axis extending in a direction in which the working part moves, a Y-axis defined as a cross product of the X-axis and a direction of gravitational force, a Z-axis extending in a direction defined as a cross product of the X-axis and the Y-axis, a torch inclination angle defined as a rotation angle about the X-axis, a torch forward tilting angle defined as a rotation angle about the Y-axis, and a torch rotation angle defined as a rotation angle about the Z-axis, and
   wherein the particular component is one or two of the torch inclination angle, the torch forward tilting angle, and the torch rotation angle.

7. The control unit of an articulated robot according to claim 6, wherein the working part is a single torch having, at the top end thereof, one point of operation having an effect of work on the workpiece, and the particular component is each of the torch inclination angle and the torch forward tilting angle.

8. The control unit of an articulated robot according to claim 6, wherein the working part is a tandem torch having, at the top end thereof, two points of operation each having an effect of work on the workpiece, and the particular component is each of the torch inclination angle and the torch rotation angle.

9. The control unit of an articulated robot according to claim 1, further comprising a speed allowance determining means for determining that a drive shaft is outside of the allowable range,
   wherein after the speed allowance determining means determines that a drive shaft outside the allowable range is present, the drive instructing means instructs drive of the articulated robot on the basis of the angles of the drive shafts calculated by the recalculating means,
   wherein if, thereafter, a difference between the angle of the first articulated drive system calculated by the angle calculating means and the angle of the first articulated drive system calculated by the recalculating means is less than or equal to a predetermined value, the drive instructing means instructs drive of the articulated robot on the basis of the angles of the drive shafts calculated by the angle calculating means instead of the angles of the drive shafts calculated by the recalculating means.

10. The control unit of an articulated robot according to claim 9, wherein upon switching from drive control of the articulated robot based on the angles of the drive shafts calculated by the recalculating means to drive control of the articulated robot based on the angles of the drive shafts calculated by the angle calculating means, the drive instructing means gradually varies each of the angles of the drive shafts within a predetermined fluctuation range.

11. A method for controlling an articulated robot, the articulated robot including a first articulated drive system having a working part that moves along a working line of a workpiece on a top end thereof and three drive shafts that are connected to the working part and that change the attitude of the working part and a second articulated drive system having at least three drive shafts that are connected to the first articulated drive system and that change the position of the first articulated drive system, the method comprising:
   an interpolation data calculation step of calculating data describing the position and attitude of the working part at each of a plurality of interpolated points that lie on a previous teaching path connecting the work start point and attitude to the work end point and attitude of the working part in a base coordinate system of the articulated robot;
   an angle calculation step of calculating the angles of all of the drive shafts in the first articulated drive system and the second articulated drive system, the angles representing the position and the attitude of the working part at each of the interpolated points by finding a solution to an inverse kinematics problem from the data calculated in the interpolation data calculation step;
   a speed calculation step of calculating the speeds of two drive shafts located at both ends of the first articulated drive system when the attitude of the working part is moved to the next interpolated point on the basis of a difference between the angle of each of the drive shafts of the first articulated drive system at a current interpolated point and the angle at the next interpolated point calculated in the angle calculating step;
   an attitude data conversion step of converting the data calculated in the interpolation data calculation step into attitude data describing the attitude of the working part in a work coordinate system having an axis extending in a moving direction of the working part, an axis extending in a direction that is perpendicular to the axis in the moving direction, and an axis perpendicular to each of the two axes;
   a recalculating step of, if the speed of at least one of the two drive shafts located at both the ends of the first articulated drive system and calculated in the speed calculating step is outside a predetermined allowable range, recalculating the angles of the drive shafts of the first articulated drive system so that the speeds of the two drive shafts located at both the ends of the first articulated drive system are within the allowable range without changing the moving speed of the working part and with reducing variation of one or two of particular components of the attitude data of the working part at the next interpolated point converted in the attitude data conversion step and recalculating the angles of the drive shafts of the second articulated drive system on the basis of the calculated angles of the drive shafts of the first articulated drive system and the position of the working part calculated in the interpolation data calculation step, wherein
   the recalculating step includes the following steps:
      angle candidate calculating step for calculating, on the basis of the angle of each of the drive shafts of the first articulated drive system at the current interpolated point, a plurality of candidates of the angle of each of the drive shafts so that the angle of each of the drive shafts follows the angle at the next interpolated point calculated in the angle calculating step and, in addition, the speeds of two drive shafts located at both ends of the first articulated drive system at the next interpolated point are within the allowable range,
      attitude data calculating step for calculating attitude data that defines the attitude of the working part at the next interpolated point in the work coordinate system when each of the candidates of the angle calculated in the angle candidate calculating step is employed, and
      angle selecting step for selecting, from among the plurality of attitude data calculated in the attitude data calculating step, attitude data having the smallest variation of the particular component for the attitude data of the working part at the next interpolated point converted in the attitude data converting step and selecting the angle corresponding to the attitude data as the angle of the drive shaft;
and
a drive instruction step of, if the speeds of the two drive shafts located at both ends of the first articulated drive system calculated in the speed calculation step are within the allowable range, driving the articulated robot on the basis of the angles of the drive shafts calculated in the angle calculation step and, if the speed of at least one of the two drive shafts located at both ends of the first articulated drive system calculated in the speed calculation step is outside the allowable range, driving the articulated robot on the basis of the angles of the drive shafts calculated in the recalculation step.

12. A control program executed by a computer for controlling an articulated robot, the articulated robot including a first articulated drive system having a working part that moves along a working line of a workpiece on a top end thereof and three drive shafts that are connected to the working part and that change the attitude of the working part and a second articulated drive system having at least three drive shafts that are connected to the first articulated drive system and that change the position of the first articulated drive system, the program comprising:

an interpolation data calculation step of calculating data describing the position and attitude of the working part at each of a plurality of interpolated points that lie on a previous teaching path connecting the work start point and attitude to the work end point and attitude of the working part in a base coordinate system of the articulated robot;

an angle calculation step of calculating the angles of all of the drive shafts in the first articulated drive system and the second articulated drive system, the angles representing the position and the attitude of the working part at each of the interpolated points by finding a solution to an inverse kinematics problem from the data calculated in the interpolation data calculation step;

a speed calculation step of calculating the speeds of two drive shafts located at both ends of the first articulated drive system when the attitude of the working part is moved to the next interpolated point on the basis of a difference between the angle of each of the drive shafts of the first articulated drive system at a current interpolated point and the angle at the next interpolated point calculated in the angle calculating step;

an attitude data conversion step of converting the data calculated in the interpolation data calculation step into attitude data describing the attitude of the working part in a work coordinate system having an axis extending in a moving direction of the working part, an axis extending in a direction that is perpendicular to the axis in the moving direction, and an axis perpendicular to each of the two axes;

a recalculating step of, if the speed of at least one of the two drive shafts located at both the ends of the first articulated drive system and calculated in the speed calculating step is outside a predetermined allowable range, recalculating the angles of the drive shafts of the first articulated drive system so that the speeds of the two drive shafts located at both the ends of the first articulated drive system are within the allowable range without changing the moving speed of the working part and with reducing variation of one or two of particular components of the attitude data of the working part at the next interpolated point converted in the attitude data conversion step and recalculating the angles of the drive shafts of the second articulated drive system on the basis of the calculated angles of the drive shafts of the first articulated drive system and the position of the working part calculated in the interpolation data calculation step, wherein the recalculating step includes the following steps:
angle candidate calculating step for calculating, on the basis of the angle of each of the drive shafts of the first articulated drive system at the current interpolated point, a plurality of candidates of the angle of each of the drive shafts so that the angle of each of the drive shafts follows the angle at the next interpolated point calculated in the angle calculating step and, in addition, the speeds of two drive shafts located at both ends of the first articulated drive system at the next interpolated point are within the allowable range, attitude data calculating step for calculating attitude data that defines the attitude of the working part at the next interpolated point in the work coordinate system when each of the candidates of the angle calculated in the angle candidate calculating step is employed, and angle selecting step for selecting, from among the plurality of attitude data calculated in the attitude data calculating step, attitude data having the smallest variation of the particular component for the attitude data of the working part at the next interpolated point converted in the attitude data converting step and selecting the angle corresponding to the attitude data as the angle of the drive shaft; and a drive instruction step of, if the speeds of the two drive shafts located at both ends of the first articulated drive system calculated in the speed calculation step are within the allowable range, driving the articulated robot on the basis of the angles of the drive shafts calculated in the angle calculation step and, if the speed of at least one of the two drive shafts located at both ends of the first articulated drive system calculated in the speed calculation step is outside the allowable range, driving the articulated robot on the basis of the angles of the drive shafts calculated in the recalculation step.

* * * * *